United States Patent
Huang et al.

(10) Patent No.: US 9,657,517 B2
(45) Date of Patent: May 23, 2017

(54) WINDOW SHADE AND ACTUATING SYSTEM THEREOF

(71) Applicant: TEH YOR CO., LTD., Taipei (TW)

(72) Inventors: Chin-Tien Huang, New Taipei (TW); Fu-Lai Yu, New Taipei (TW)

(73) Assignee: TEH YOR CO., LTD. (TW)

( * ) Notice: Subject to any disclaimer, the term of this patent is extended or adjusted under 35 U.S.C. 154(b) by 116 days.

(21) Appl. No.: 14/623,002

(22) Filed: Feb. 16, 2015

(65) Prior Publication Data

US 2015/0354275 A1 Dec. 10, 2015

Related U.S. Application Data

(60) Provisional application No. 62/009,361, filed on Jun. 9, 2014.

(51) Int. Cl.
| | |
|---|---|
| *E06B 9/262* | (2006.01) |
| *E06B 9/78* | (2006.01) |
| *F16H 31/00* | (2006.01) |
| *E06B 9/32* | (2006.01) |
| *E06B 9/322* | (2006.01) |
| *E06B 9/324* | (2006.01) |

(52) U.S. Cl.
CPC ............... *E06B 9/78* (2013.01); *E06B 9/32* (2013.01); *E06B 9/322* (2013.01); *E06B 9/324* (2013.01); *F16H 31/007* (2013.01); *E06B 2009/2627* (2013.01); *E06B 2009/3222* (2013.01); *E06B 2009/785* (2013.01); *Y10T 74/1547* (2015.01)

(58) Field of Classification Search
CPC . E06B 9/32; E06B 9/322; E06B 9/324; E06B 9/78; E06B 2009/2627; E06B 2009/3222; E06B 2009/785; F16H 31/007

USPC .................................................. 160/168.1 R
See application file for complete search history.

(56) References Cited

U.S. PATENT DOCUMENTS

| | | | | |
|---|---|---|---|---|
| 3,306,406 A | * | 2/1967 | Poliseo | ................... F16D 41/22 192/104 R |
| 4,466,475 A | * | 8/1984 | Saito | ........................ E06B 9/90 160/297 |

(Continued)

FOREIGN PATENT DOCUMENTS

| | | |
|---|---|---|
| CA | 2863934 A1 | 8/2013 |
| CN | 201991425 U | 9/2011 |

(Continued)

OTHER PUBLICATIONS

The Office Action dated Aug. 11, 2016 in co-pending CN Patent Application No. 201510084099.2.

(Continued)

*Primary Examiner* — Katherine Mitchell
*Assistant Examiner* — Abe Massad
(74) *Attorney, Agent, or Firm* — Baker & McKenzie LLP; David I. Roche

(57) ABSTRACT

The structures described herein use an actuating system that can selectively switch between a lower and a raise mode of operation by rotating a rod assembly, and use a downward displacement of a pull member to lower and raise the window shade depending on whether its switching state. The actuating systems are simple to operate, allow convenient adjustment of the window shade, and are safe as the pull member has a limited length of extension.

20 Claims, 30 Drawing Sheets

(56) References Cited

U.S. PATENT DOCUMENTS

| | | | | |
|---|---|---|---|---|
| 5,890,529 A * | 4/1999 | Haarer | ............... | E06B 9/78 |
| | | | | 160/319 |
| 7,578,334 B2 * | 8/2009 | Smith | ............... | E06B 9/262 |
| | | | | 160/121.1 |
| 7,665,507 B2 * | 2/2010 | Naoki | ............... | E06B 9/42 |
| | | | | 160/170 |
| 8,191,605 B2 * | 6/2012 | Kwak | ............... | E06B 9/42 |
| | | | | 160/193 |
| 8,746,320 B2 * | 6/2014 | Yu | ............... | E06B 9/322 |
| | | | | 160/170 |
| 9,528,318 B2 * | 12/2016 | Huang | ............... | E06B 9/68 |
| 2013/0220561 A1 | 8/2013 | Yu et al. | | |
| 2013/0340951 A1 * | 12/2013 | Yu | ............... | E06B 9/322 |
| | | | | 160/168.1 P |

FOREIGN PATENT DOCUMENTS

| | | |
|---|---|---|
| CN | 102808572 A | 12/2012 |
| KR | 20130073037 | 7/2013 |
| WO | 2012026912 A1 | 3/2012 |

OTHER PUBLICATIONS

English translations of the Abstracts of the non-English references cited herein.
International search report and written opinion of the international searching authority for co-pending PCT application No. PCT/US2014/061044 mailed May 29, 2015.

* cited by examiner

WINDOW SHADE AND ACTUATING SYSTEM THEREOF

CROSS-REFERENCE TO RELATED APPLICATION(S)

This patent application claims priority to U.S. Provisional Patent Application No. 62/009,361 filed on Jun. 9, 2014, which is incorporated herein by reference.

BACKGROUND

1. Field of the Invention

The present invention relates to window shades, and actuating systems used in window shades.

2. Description of the Related Art

Many types of window shades are currently available on the market, such as Venetian blinds, roller shades and honeycomb shades. The shade when lowered can cover the area of the window frame, which can reduce the amount of light entering the room through the window and provided increased privacy. Conventionally, the window shade is provided with an operating cord that can be actuated to raise or lower the window shade. In particular, the operating cord may be pulled downward to raise the window shade, and released to lower the window shade.

In a conventional construction of the window shade, the operating cord can be connected with a drive axle. When the operating cord is pulled downward, the drive axle can rotate to wind suspension cords for raising the window shade. When the operating cord is released, the drive axle can be driven to rotate in a reverse direction for lowering the window shade.

However, this conventional construction may require to use an increased length of the operating cord for window shades that have greater vertical lengths. The greater length of the operating cord may affect the outer appearance of the window shade. Moreover, there is the risk of child strangle on the longer operating cord. To reduce the risk of accidental injuries, the operating cord may be maintained at a higher position so that a young child cannot easily reach the operating cord. Unfortunately, when the operating cord is pulled downward to raise the window shade, the operating cord may still move to a lower position and become accessible for a child. With respect to a regular user, the manipulation of longer operating cords may also be less convenient. For example, the longer operating cord may become entangled, which may render its operation difficult.

To remedy the above disadvantages, certain existing approaches propose a mechanism that can be actuated by repeated pulling actions applied on a cord for raising the window shade. However, these approaches usually need a manual action different from the pulling action for lowering the window shade.

Therefore, there is a need for a window shade that is simple to operate, and address or improve at least the foregoing issues.

SUMMARY

The present application describes a window shade and an actuating system for use with the window shade.

In one embodiment, the actuating system includes a transmission axle, a central gear, a carrier, a driving unit and a switch member. The transmission axle and the central gear are rotationally coupled with each other, the transmission axle defining an axis and being rotatable to collapse and expand a window shade. The carrier supports a plurality of planetary gears that are disposed around the central gear, the carrier being rotatable relative to the central gear, and the planetary gears being respectively meshed with the central gear. The driving unit includes a ring and a pull member, the ring being arranged around the planetary gears and internally meshed with the planetary gears, and the pull member being operable to drive rotation of the ring in a first direction. The switch member is rotationally coupled with the carrier, and is operable to selectively engage with either of the ring and a fixed stop member axially spaced apart from the ring. A rotation of the ring in the first direction drives a rotation of the central gear and the transmission axle in a second direction opposite to the first direction when the switch member is engaged with the stop member, and a rotation of the ring in the first direction drives the central gear and the transmission axle to rotate in the same first direction when the switch member is engaged with ring.

DETAILED DESCRIPTION OF THE EMBODIMENTS

Figure 1:
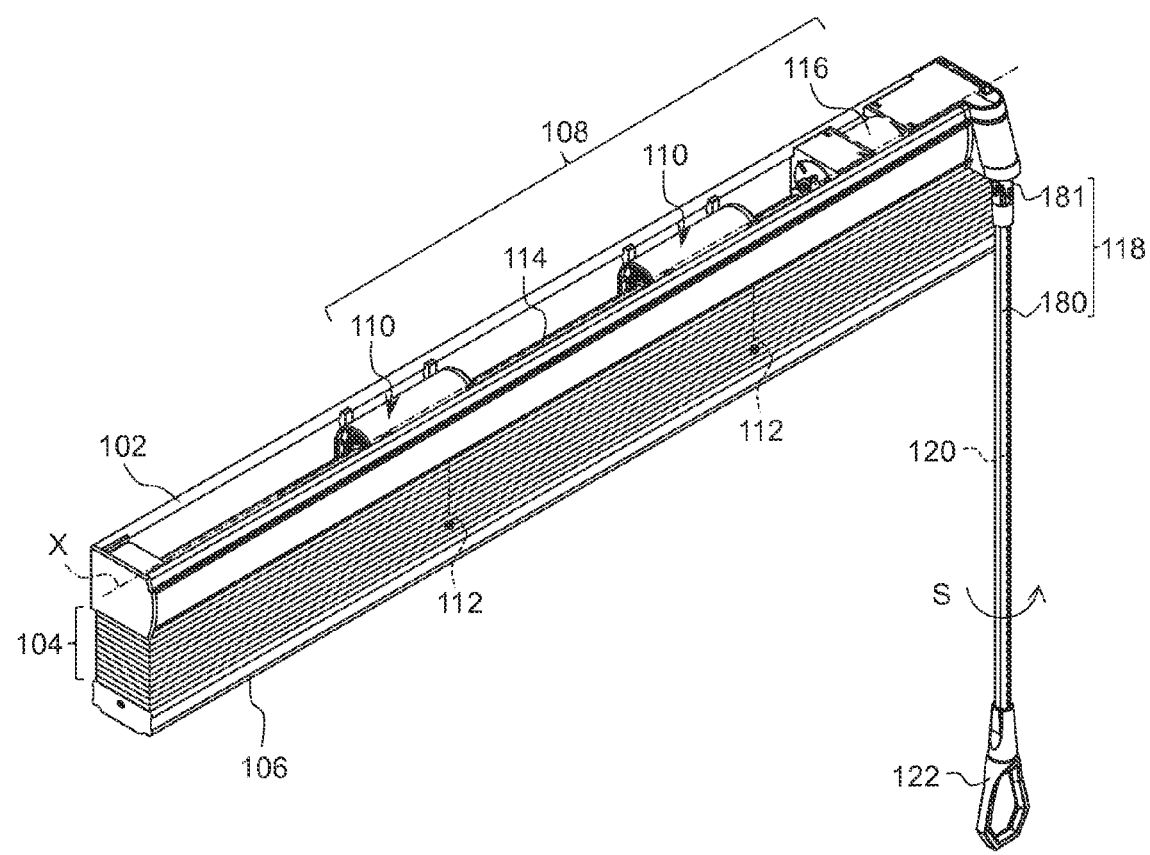
FIG. 1 is a perspective view illustrating an embodiment of a window shade.
Figure 2:
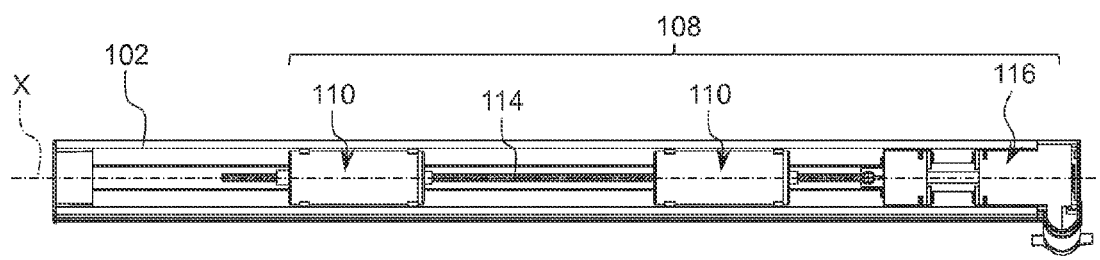
FIG. 2 is top view of the window shade shown in FIG. 1.
Figure 3:
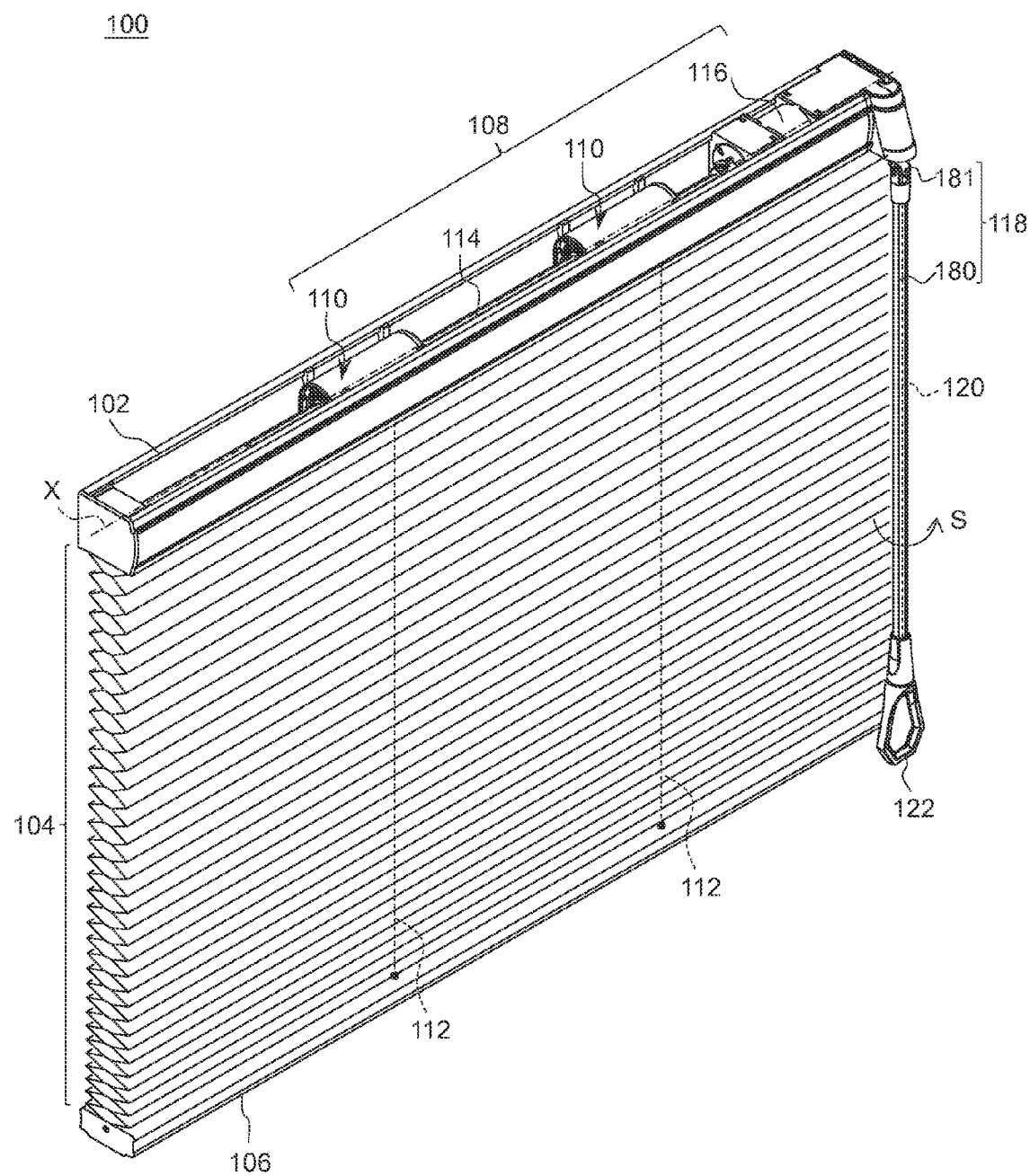
FIG. 3 is a schematic view illustrating the window shade of FIG. 1 in a fully lowered state.

FIG. 1 is a perspective view illustrating an embodiment of a window shade 100, FIG. 2 is a top view illustrating the window shade 100, and FIG. 3 is a schematic view illustrating the window shade 100 in a fully lowered state. The window shade 100 can includes a head rail 102, a shading structure 104, and a bottom part 106 disposed at a bottom of the shading structure 104. The head rail 102 may be of any types and shapes. The head rail 102 may be affixed at a top of a window frame, and the shading structure 104 and the bottom part 106 can be suspended from the head rail 102.

The shading structure 104 can have any suitable constructions. For example, the shading structure 104 can include a honeycomb structure made from a cloth material (as shown), a Venetian blind construction, or a plurality of rails or slats extending vertically and parallel to one another.

The bottom part 106 is disposed at a bottom of the window shade 100, and is movable vertically relative to the head rail 102 to expand and collapse the shading structure 104. In one embodiment, the bottom part 106 may be formed as an elongated rail. However, any types of weighing structures may be suitable. In some embodiment, the bottom part 106 may also be formed by a lowermost portion of the shading structure 104.

For driving upward and downward displacements of the shading structure 104 and the bottom part 106, the window shade 100 can further include an actuating system 108 comprised of a plurality of winding units 110, a plurality of suspension members 112 (shown with phantom lines in FIG. 1) respectively coupled with the winding units 110, a transmission axle 114, a control module 116, a rod assembly 118 and a pull member 120 (shown with phantom lines in FIG. 1). The suspension members 112 can exemplary be suspension cords that extend vertically between the head rail 102 and the bottom part 106. Each of the suspension members 112 can have a first end portion connected with one corresponding winding unit 110, and a second end portion connected with the bottom part 106. The winding units 110 can respectively have drums rotatable to wind and unwind the suspension members 112 for raising and lowering the bottom part 106.

The transmission axle 114 can extend lengthwise along the head rail 102 to define a longitudinal axis X, and the winding units 110 and the control module 116 and can be coaxially connected with the transmission axle 114. The transmission axle 114 can be actuated through the control module 116 to rotate in either direction, which in turn drives concurrent rotation of the winding units 110 for winding or unwinding the suspension members 112.

In the illustrated embodiment, the pull member 120 can exemplary be a cord. The pull member 120 is connected with the control module 116, and can be pulled downward to drive rotation of the transmission axle 114 in either direction. A handle 122 can be connected with a lower end of the pull member 120 to facilitate its operation. The pull member 120 has a length that is substantially smaller than the height of the totally expanded shading structure 104, and the control module 116 is configured such that a user repeatedly applies a sequence of pull and release actions on the pull member 120 to progressively lower or raise the bottom part 106. For example, the overall length of the pull member 120 can be one third of the height of the totally expanded shading structure 104, and the pull member 120 can be repeatedly pulled about three times to entirely lower the shading structure 104. This process is similar to a ratcheting technique allowing the user to pull the pull member 120 to lower or raise the bottom part 106 by a certain amount, allow the pull member 120 to retract, and then actuate the pull member 120 again to continue to lower or raise the bottom part 106. This process may be repeated until the shading structure 104 reaches a desired height.

The control module 116 can be switched by rotating the rod assembly 118 to select any of two driving modes of operation for the operating cord 120: a raise or upward driving mode where the pull member 120 is pulled downward to drive an upward displacement the bottom part 106, and a lower or downward driving mode where the pull member 120 is pulled downward to drive a downward displacement of the bottom part 106. When the pull member 120 is not operated, the suspended weight of the shading structure 104 and the bottom part 106 can be sustained by an arrester, which may also be incorporated in the control module 116.

Figure 4:
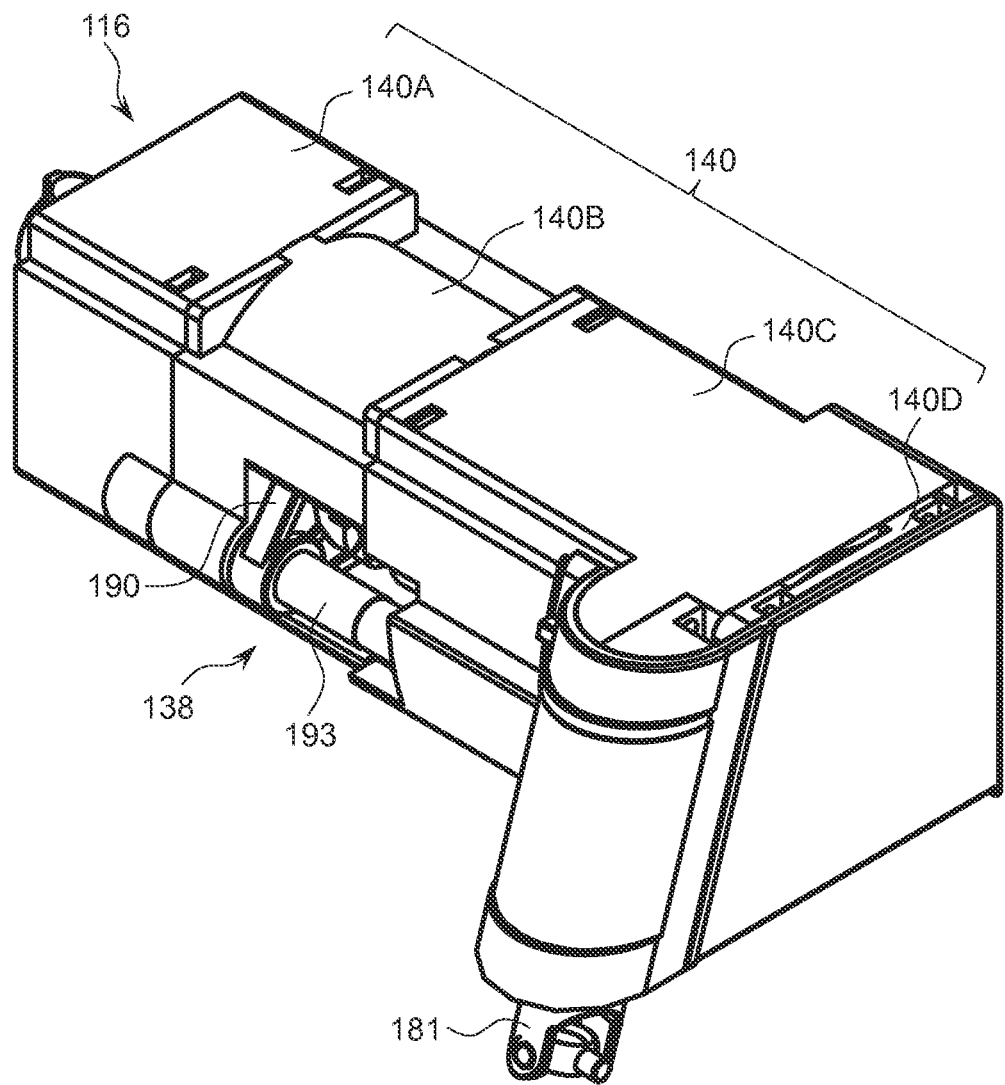
FIG. 4 is a schematic view illustrating a control module used in an actuating system of the window shade shown in FIG. 1.
Figure 5:
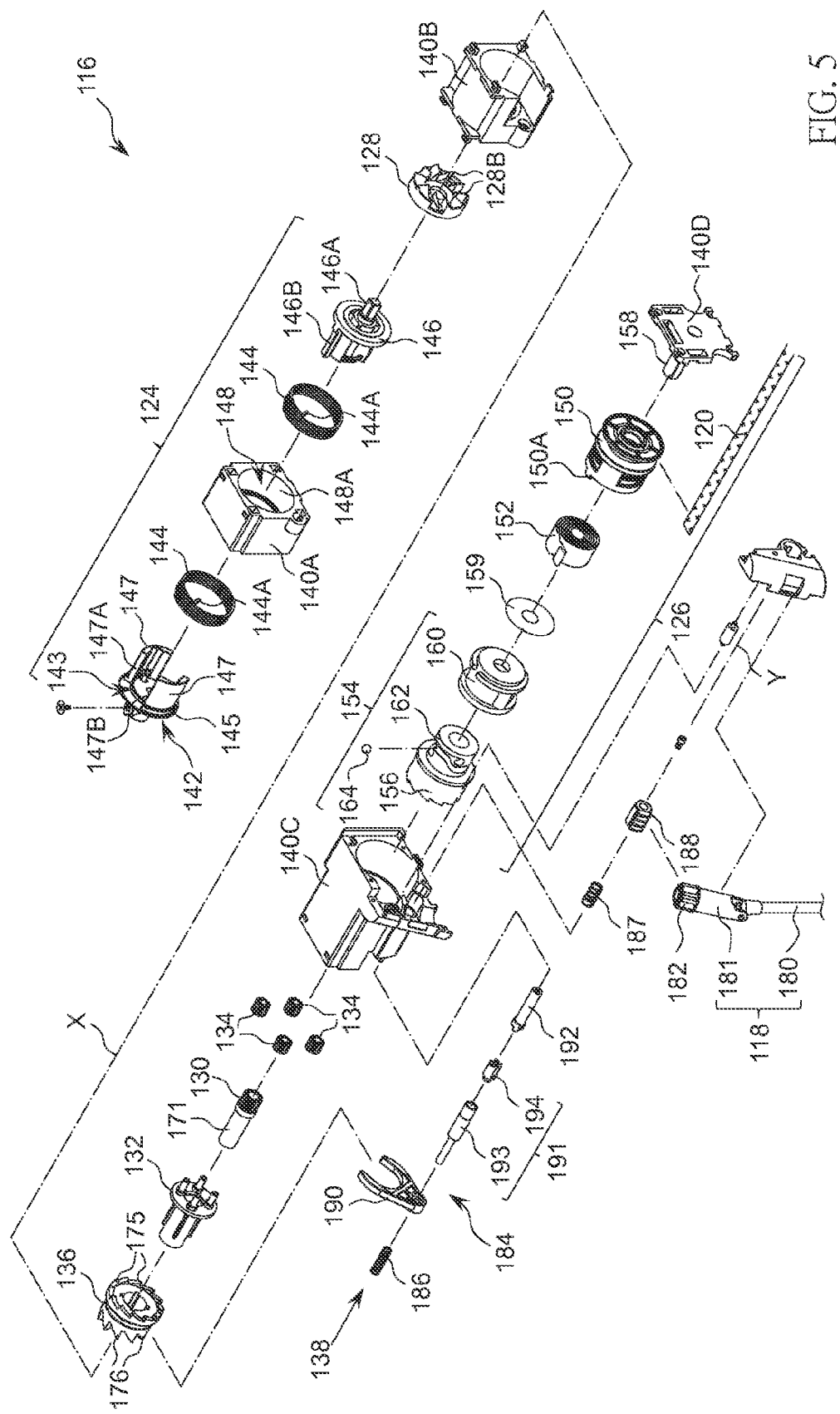
FIG. 5 is an exploded view illustrating an actuating mechanism implemented in the control module shown in FIG. 4.
Figure 6:
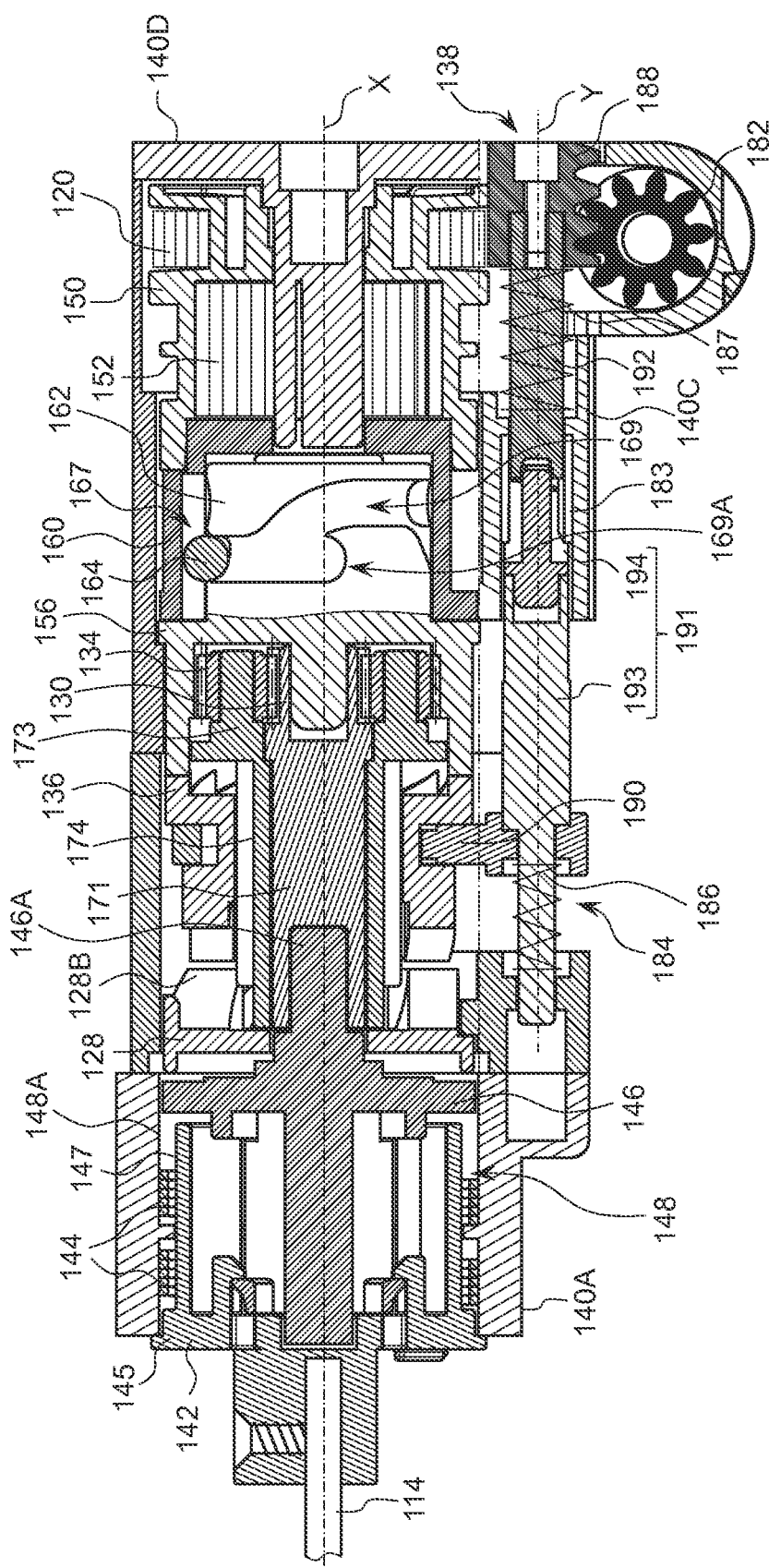
FIG. 6 is a cross-sectional view illustrating the control module shown in FIG. 4.

FIG. 4 is a schematic view of the control module 116, FIG. 5 is an exploded view illustrating an actuating mechanism implemented in the control module 116, and FIG. 6 is a cross-sectional view illustrating the control module 116. The control module 116 can include an arrester 124, a driving unit 126, a stop member 128, a central gear 130, a carrier 132, a plurality of planetary gears 134, a switch member 136 and a switch actuating mechanism 138. These components of the control module 116 can be arranged in a casing 140 formed by the assembly of multiple housing portions 140A, 140B and 140C and an end cap 140D affixed with one another.

The arrester 124 can include a collar 142, one or more spring 144 (two springs 144 are exemplary shown) and an actuating part 146. The collar 142 can be attached with the transmission axle 114 for unitary rotation therewith. In one embodiment, the collar 142 can have an annular portion 145, and two spaced-apart flanges 147 that respectively project from the annular portion 145. The two flanges 147 can respectively define two flange surfaces 147A and 147B that are offset from the axis of the transmission axle 114 and delimit two opposite sides of a gap 143.

Each of the springs 144 can be a coil spring having two spaced-apart prongs 144A and 144B. The springs 144 are assembled in a cavity 148 of the casing 140 coaxial to the axis of the transmission axle 114, and have respective outer circumferences in contact with an inner sidewall 148A of the cavity 148. The cavity 148 can be provided, e.g., in the housing portion 140A. Moreover, the springs 144 are positioned to encircle the flanges 147 of the collar 142, and the prongs 144A and 144B can be respectively received in the gap 143 between the two flange surfaces 147A and 147B. In other words, the two flange surfaces 147A and 147B are located outside a space 149 (better shown in FIGS. 7-9) delimited between the two prongs 144A and 144B.

The actuating part 146 can include a shaft portion 146A, and a rib 146B eccentric from the axis of the shaft portion 146A. The actuating part 146 can be pivotally assembled coaxial to the axis of the transmission axle 114, the shaft portion 146A being aligned with the transmission axle 114, and the rib 146B being received in the space 149 between the two prongs 144A and 144B of each spring 144. An end portion of the actuating part 146 opposite to the side of the shaft portion 146A can be attached with the transmission axle 114 through a connection that rotationally couples the actuating part 146 with the transmission axle 114 (e.g., the actuating part 146 may be affixed with the collar 142). The actuating part 146 and the transmission axle 114 thus can rotate in unison in two directions to unlock the arrester 124 and either raise or lower the bottom part 106.

Figure 7:
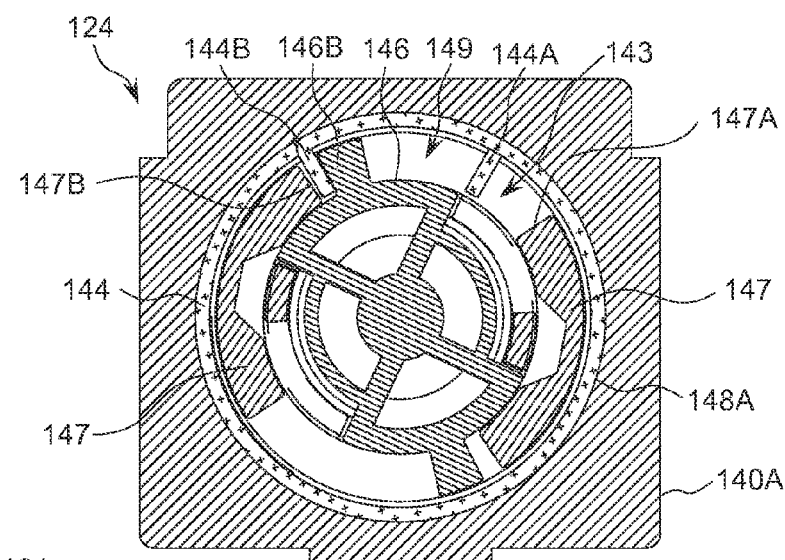
FIG. 7 is a schematic view illustrating an arrester of the actuating system in a locking state.

In conjunction with FIGS. 4-6, FIGS. 7-9 are schematic views illustrating exemplary operation of the arrester 124. In FIG. 7, the arrester 124 is exemplary illustrated in a locking state, and no manual pulling action is applied on the pull member 120. In this state, a vertical weight exerted by the bottom part 106 on the suspension members 112 can result in the application of a torque that rotationally biases the collar 142 in a direction to urge one of the two flange surfaces 147A and 147B (e.g., the flange surface 147B) against one of the two prongs 144A and 144B (e.g., the prong 144B). This pushing force is in a direction that biases the prongs 144A and 144B toward each other (i.e., in a direction narrowing the space 149), which urges the springs 144 to enlarge and frictionally contact with the inner sidewall 148A of the cavity 148. The frictional contact between the outer circumference of each spring 144 with the inner sidewall 148A can counteract the torque induced by the suspended weight, and prevent rotation of the springs 144, the collar 142 and the transmission axle 114 affixed with the collar 142 in a direction of lowering the bottom part 106. The bottom part 106 can be thereby kept stationary at a desired height.

For turning the arrester 124 from the locking state to a release state, the actuating part 146 can be driven in rotation so as to cause the rib 146B to push against either of the two prongs 144A and 144B (i.e., in a direction for enlarging the space 149), which causes the springs 144 to contract and loosen the frictional contact with the inner sidewall 148A of the cavity 148. The contracted springs 144 can then be urged in rotation by the rib 146B of the actuating part 146, and either of the two prongs 144A and 144B can in turn push against either of the flange surfaces 147A and 147B of the collar 142 to drive rotation of the collar 142 and transmission axle 114 for raising or lowering the bottom part 106.

Figure 8:
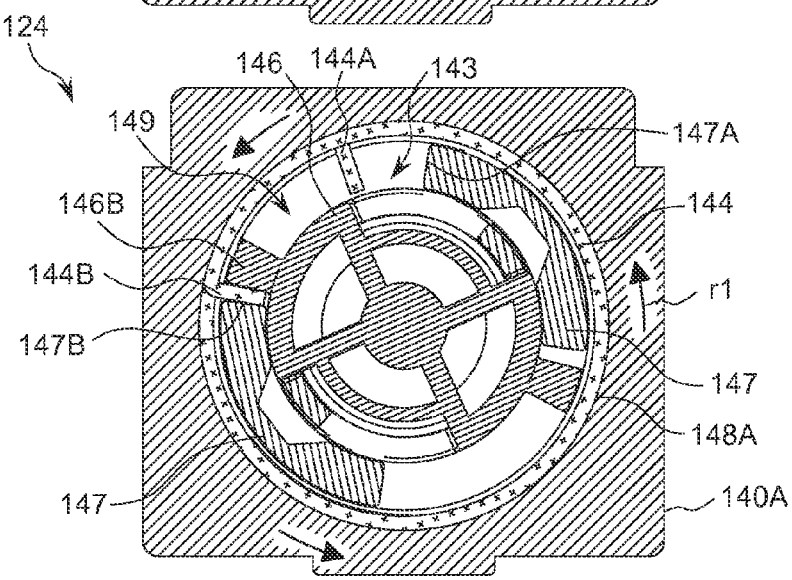
FIG. 8 is a schematic view illustrating the arrester of the actuating system turned to a release state for raising a bottom part of the window shade.

Referring to FIG. 8, when the actuating part 146 exemplary rotates in a direction r1 for raising the bottom part 106, the rib 146B can exemplary push against the prong 144B to contract each spring 144 and urge rotation of the spring 144 in the same direction. As the contracted springs 144 rotate with the actuating part 146, the prongs 144B of the springs 144 can in turn push against the flange surface 147B of the collar 142, which causes rotation of the collar 142 and the transmission axle 114 in the same direction r1 to raise the bottom part 106.

Figure 9:
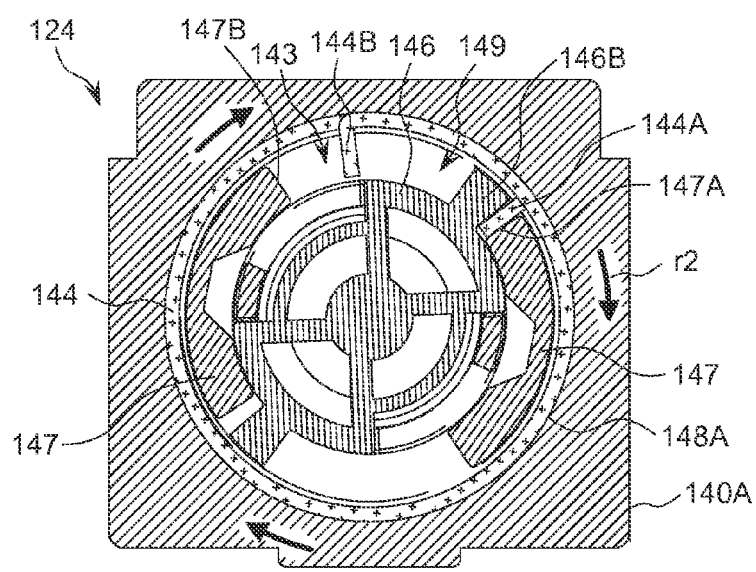
FIG. 9 is a schematic view illustrating the arrester of the actuating system turned to a release state for lowering a bottom part of the window shade.
Figure 10:
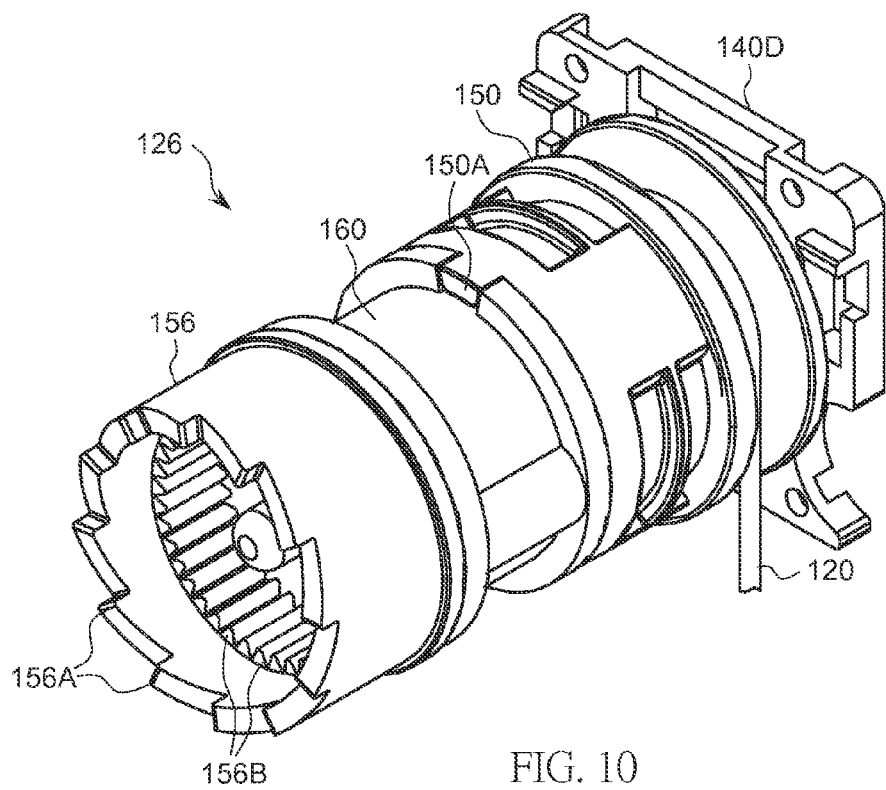
FIG. 10 is a perspective view illustrating a construction of a driving unit incorporated in the control module shown in FIG. 4.
Figure 11:
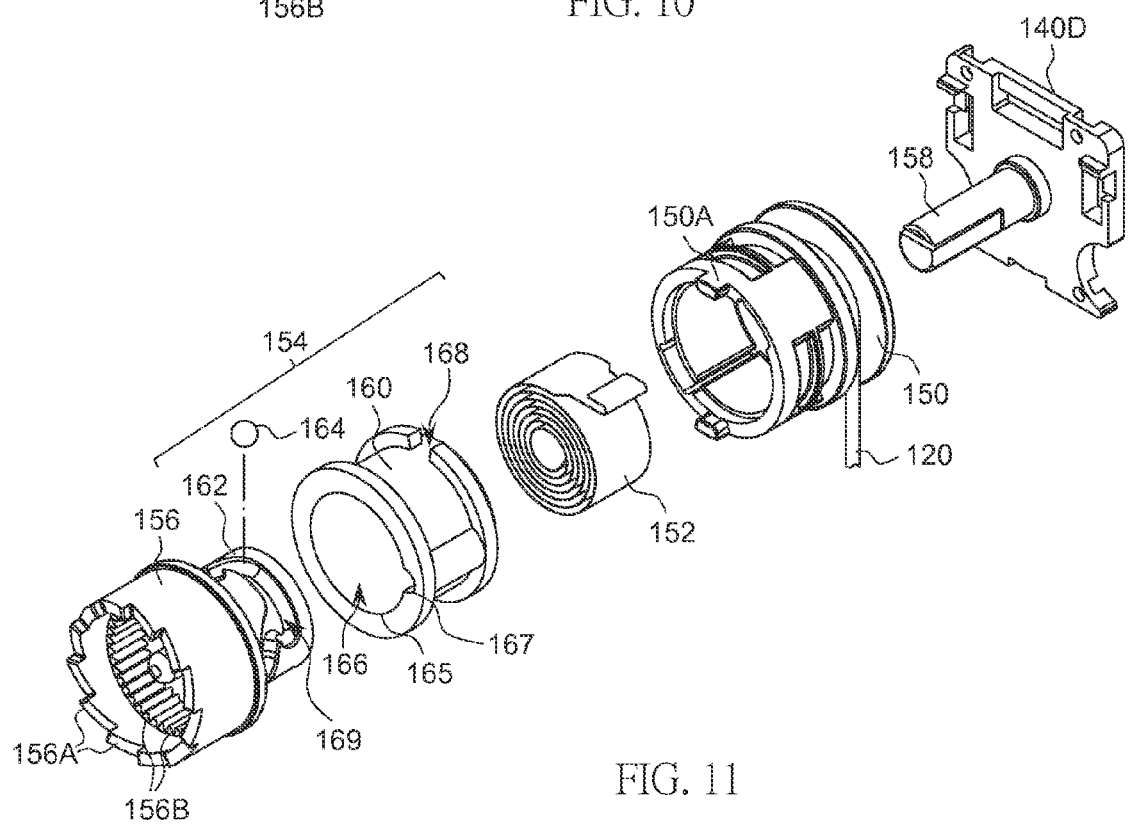
FIG. 11 is an exploded view illustrating the construction of the driving unit shown in FIG. 10.

Referring to FIG. 9, when the actuating part 146 rotates in a direction r2 opposite to r1 for lowering the bottom part 106, the rib 146B can push against the prong 144A to contract each spring 144 and urge rotation of the spring 144 in the same direction. As the contracted springs 144 rotate with the actuating part 146, the prongs 144A of the springs 144 can then push against the flange surface 147A of the collar 142, which causes rotation of the collar 142 and the transmission axle 114 in the same direction r2 to lower the bottom part 106.

In conjunction with FIGS. 4-6, FIGS. 10 and 11 are respectively perspective and exploded views illustrating a construction of the driving unit 126. Referring to FIGS. 4-6, 10 and 11, the driving unit 126 can include the pull member 120 described previously, a spool 150 to which the pull member 120 is connected, a spring 152, a unidirectional coupling device 154 and a ring 156. The spool 150 can be pivotally connected with a fixed shaft 158 that is fixedly connected with the end cap 140D. The fixed shaft 158 can be coaxial to the transmission axle 114, and can define the pivot axis of the spool 150. A tab 150A may be provided on the spool 150 at a location radially offset from its pivot axis. The spool 150 can be affixed with an end of the pull member 120, which can extend outside the casing 140 of the control module 116.

The spring 152 can be a spiral torsion spring arranged in an inner cavity of the spool 150, and can have an inner end connected with the fixed axle 158 and an outer end connected with the spool 150. A washer 159 can be assembled about the fixed shaft 158 to retain the spring 152 in the interior of the spool 150. The spring 152 can bias the spool 150 to rotate for winding the pull member 120.

The unidirectional coupling device 154 can include a sleeve 160, a drum 162 and a ball 164. The sleeve 160 can be pivotally connected with the fixed shaft 158 adjacent to the spool 150. The sleeve 160 can have an inner cylindrical sidewall 165 that defines an inner cavity 166 and is formed with a slot 167 extending parallel to the axis of the fixed shaft 158. A periphery of the sleeve 160 can have a notch 168 in which is engaged the tab 150A of the spool 150, whereby the sleeve 160 and the spool 150 can be rotationally coupled with each other in two directions of rotation.

The drum 162 can have an outer surface provided with a closed guide track 169 that circumferentially runs around the drum 162. The drum 162 can be pivotally connected through the inner cavity 166 of the sleeve 160 about an axis that is coaxial to the fixed shaft 158. When the drum 162 is assembled with the sleeve 160, the slot 167 overlaps partially with the guide track 169, and the ball 164 can be movably arranged in the slot 167 and the guide track 169.

The ring 156 can be coaxially affixed with the drum 162, such that the ring 156 and the drum 162 are rotatable in unison about the same axis defined by the fixed shaft 158. In one embodiment, the ring 156 can be affixed with the drum 162. A circular rim of the ring 156 at a side opposite to that of the drum 162 can be formed with a plurality of teeth 156A protruding axially. Moreover, the ring 156 can have an internal surface provided with a plurality of inner teeth 156B projecting inward.

Figure 12:
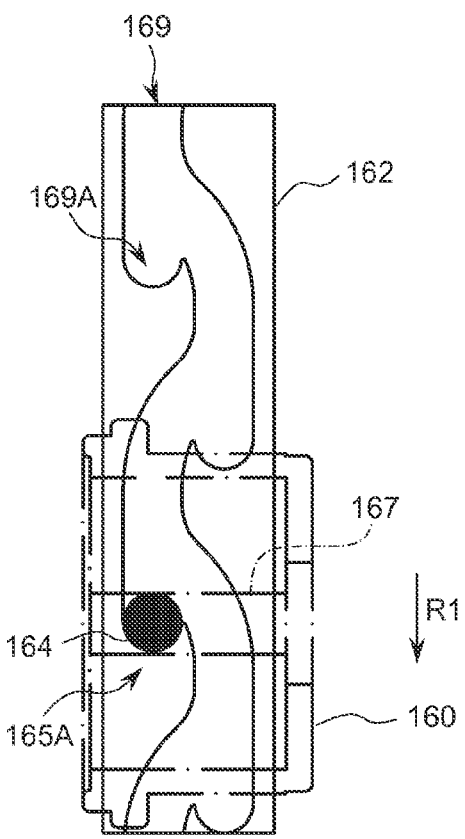
FIGS. 12 and 13 are schematic views illustrating the interaction between a sleeve, a drum and ball in the driving unit shown in FIG. 10.
Figure 13:
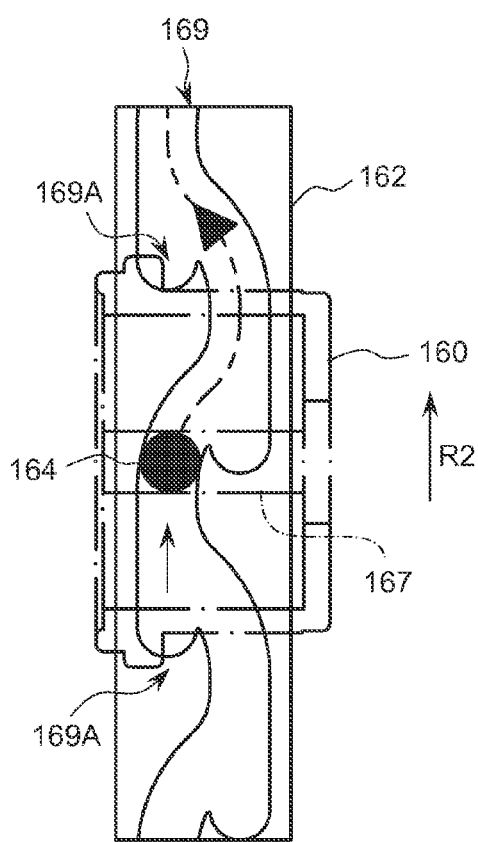

FIGS. 12 and 13 are schematic views illustrating the interaction between the sleeve 160, the drum 162 and the ball 164. The guide track 169 is represented in a planar projection in FIGS. 12 and 13. The guide track 169 can include a plurality of recessed stop regions 169A distributed around the drum 162. Referring to FIG. 12, when the sleeve 160 and the spool 150 rotate in unison in a first direction R1 for unwinding the pull member 120, the ball 164 can displace along the slot 167 and the guide track 169 until it engages with one of the stop regions 169A, whereby the rotational displacement of the spool 150 can be transmitted through the sleeve 160, the ball 164 and the drum 162 to the ring 156. In other words, a downward pulling action applied on the pull member 120 always drives the spool 150 and the ring 156 to rotate in the same direction R1.

Referring to FIG. 13, when the pull member 120 is released after it is extended downward, the spring 152 can urge the spool 150 to rotate in a second direction R2 opposite to R1 for winding the pull member 120. As the spool 150 and the sleeve 160 rotate in unison in the second direction, the ball 164 can be driven to leave the stop region 169A and move continuously along the guide track 169 of the drum 162 without being obstructed. While the spool 150 and the sleeve 160 rotate in unison for winding the pull member 120, the drum 162 and the ring 156 remain stationary.

Figure 15:
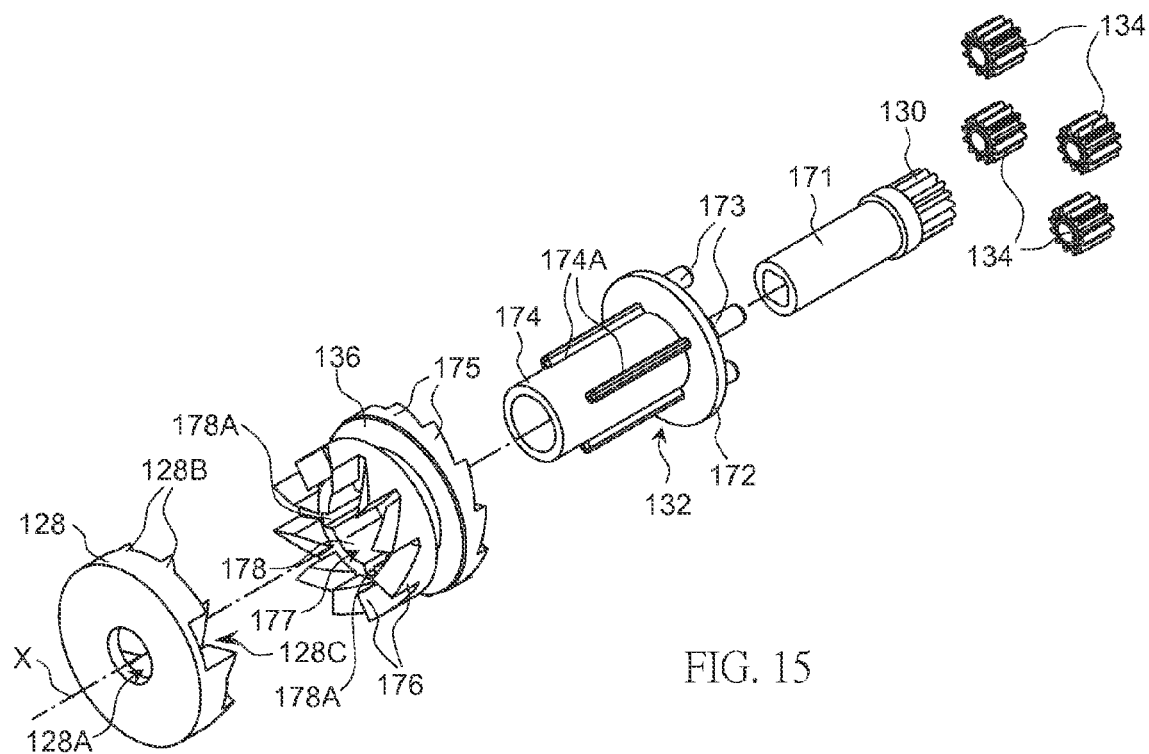
FIG. 15 is a schematic view illustrating the connection of a switch member with a carrier in the control module shown in FIG. 4.
Figure 16:
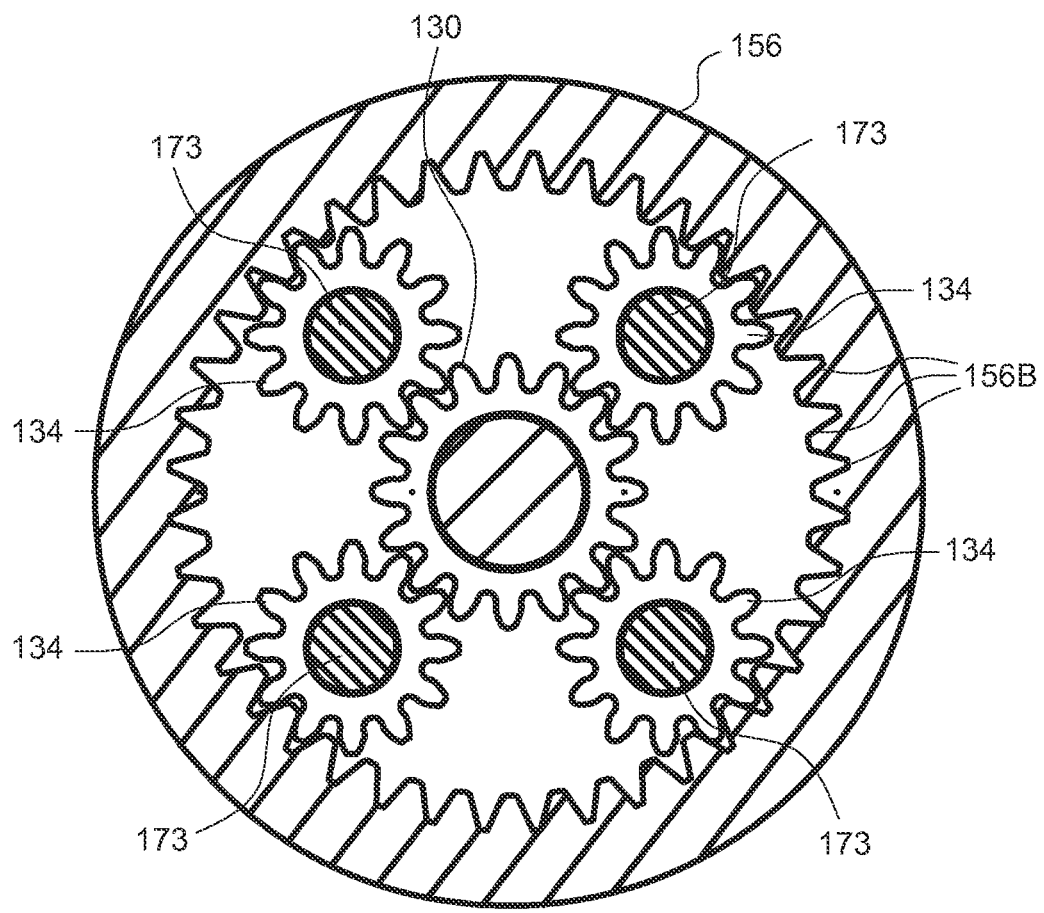
FIG. 16 is a schematic view illustrating the connection of planetary gears with a central gear and a ring in the control module shown in FIG. 4.

Referring to FIGS. 4-13, the stop member 128, the central gear 130, the carrier 132, the planetary gears 134 and the switch member 136 are arranged to selectively convert the rotational displacement of the ring 156 and the spool 150 in the first direction R1 (i.e., occurring when the pull member 120 is pulled downward) to a rotational displacement of the actuating part 146 in either of the first direction r1 for raising the bottom part 106 and the second direction r2 for lowering the bottom part 106. In conjunction with FIGS. 4-6, FIG. 14 is a schematic view illustrating the assembly of the stop member 128 with the housing portion 140B of the casing 140, FIG. 15 is a schematic view illustrating the connection of the switch member 136 with the carrier 132, and FIG. 16 is a schematic view illustrating the connection of the planetary gears 134 with the central gear 130 and the ring 156. All of the stop member 128, the central gear 130, the carrier 132, the switch member 136 and the ring 156 are disposed substantially coaxial with respect to the longitudinal axis X of the transmission axle 114.

Figure 14:
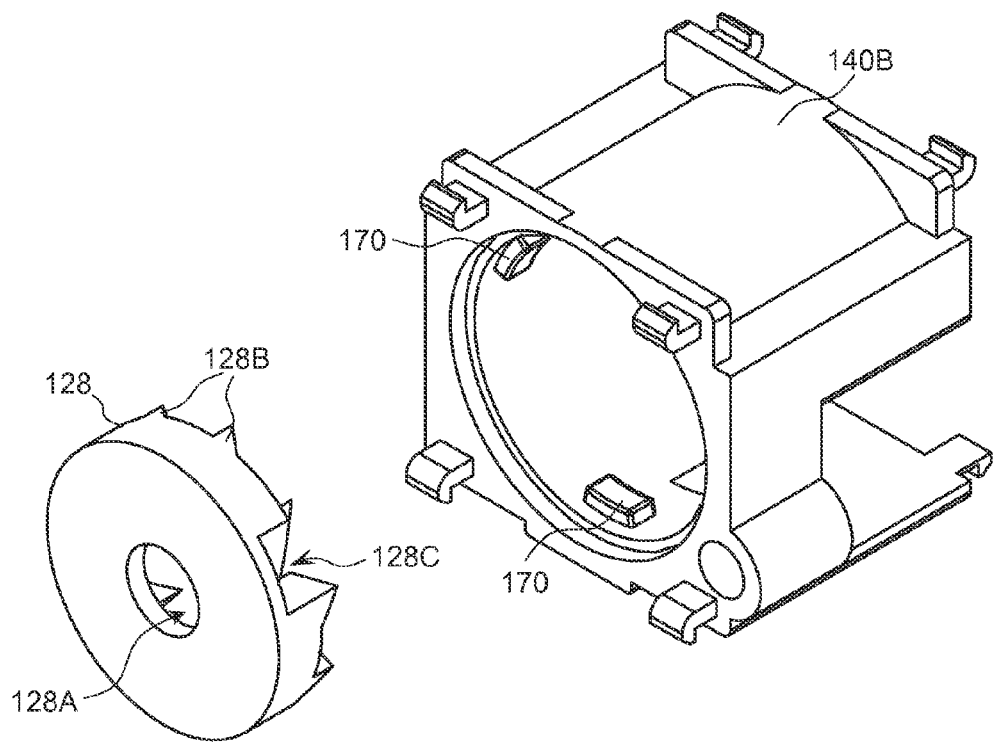
FIG. 14 is a schematic view illustrating the assembly of a stop member with a housing portion in the control module shown in FIG. 4.

Referring to FIG. 14, the stop member 128 can be exemplary formed as a disk that has an axis aligned with the fixed shaft 158. The stop member 128 can have a central hole 128A, and a plurality of teeth 128B that are located around the central hole 128A and project toward the switch member 136. An outer peripheral surface of the stop member 128 can further have one or more slot 128C. When the stop member 128 is arranged in the housing portion 140B, one or more stud 170 protruding inward from an inner surface of the housing portion 140B can respectively fit into the slots 128C so as to block rotation of stop member 128 relative to the casing 140. The stop member 128 is thereby fixed at a location axially spaced apart from the ring 156. Moreover, the shaft portion 146A of the actuating part 146 can loosely extend through the central hole 128A such that the actuating part 146 is rotatable relative to the stop member 128.

Referring to FIGS. 4-6 and 15, the central gear 130 can be affixed with a shaft portion 171. In one embodiment, the central gear 130 and the shaft portion 171 may be formed as an integral part. The central gear 130 can be connected to the actuating part 146 by fitting the shaft portion 146A of the actuating portion 146 into the shaft portion 171, whereby the central gear 130 and the actuating part 146 are rotationally coupled with each other. Because the actuating part 146 and the transmission axle 114 are affixed with each other, the central gear 130 is thus also rotationally coupled with the transmission axle 114 through its connection with the actuating part 146.

Referring to FIG. 15, the carrier 132 can be formed as an integral part including an annular portion 172 centered about the axis of the fixed shaft 158, a plurality of shaft portions 173 projecting from a first side of the annular portion 172, and a sleeve portion 174 projecting from a second side of the annular portion 172 opposite to that of the shaft portions 173. An outer surface of the sleeve portion 174 can be provided with a plurality of projecting ribs 174A disposed circumferentially around the sleeve portion 174. The carrier 132 can be pivotally assembled around the shaft portion 171, and the shaft portion 171 can extend axially through the annular portion 172 and the sleeve portion 174 of the carrier 132 to affix with the shaft portion 146A of the actuating part 146, the central gear 130 being located at the first side of the annular portion 172. Relative rotation is thus allowed between the carrier 132 and the assembly of the central gear 130 and the actuating part 146.

The switch member 136 can be pivotally assembled in a region between the ring 156 and the stop member 128. The switch member 136 can have a plurality of teeth 175 and 176 respectively projecting in two opposite directions, the teeth 175 projecting toward the ring 156, and the teeth 176 projecting toward the stop member 128. The teeth 175 and 176 can be respectively distributed along two circles of equal or different diameters that are centered on the longitudinal axis X. Moreover, the switch member 136 can have a central hole 177 delimited by a cylindrical inner sidewall 178. The inner sidewall 178 can include a plurality of slits 178A angularly spaced apart from one another and extending parallel to the longitudinal axis X. The switch member 136 can be connected with the carrier 132 with the sleeve portion 174 of the carrier 132 arranged through the central hole 177, the ribs 174A of the sleeve portion 174 being respectively received in the slits 178A of the switch member 136. The switch member 136 is thereby rotationally coupled with the carrier 132, but can slide on the sleeve portion 174 relative to the carrier 132. In particular, the switch member 136 can slide along the longitudinal axis X relative to the carrier 132 to selectively engage either the teeth 175 with the teeth 156A of the ring 156, or the teeth 176 with the teeth 128B of the stop member 128.

Referring to FIGS. 4-6, 15 and 16, the planetary gears 134 are pivotally connected with the shaft portions 173 of the carrier 132 around the central gear 130, and are positioned inside the ring 156. The planetary gears 134 are respectively meshed with the central gear 130 and the inner teeth 156B of the ring 156, the ring 156 surrounding the planetary gears 134.

Figure 17:
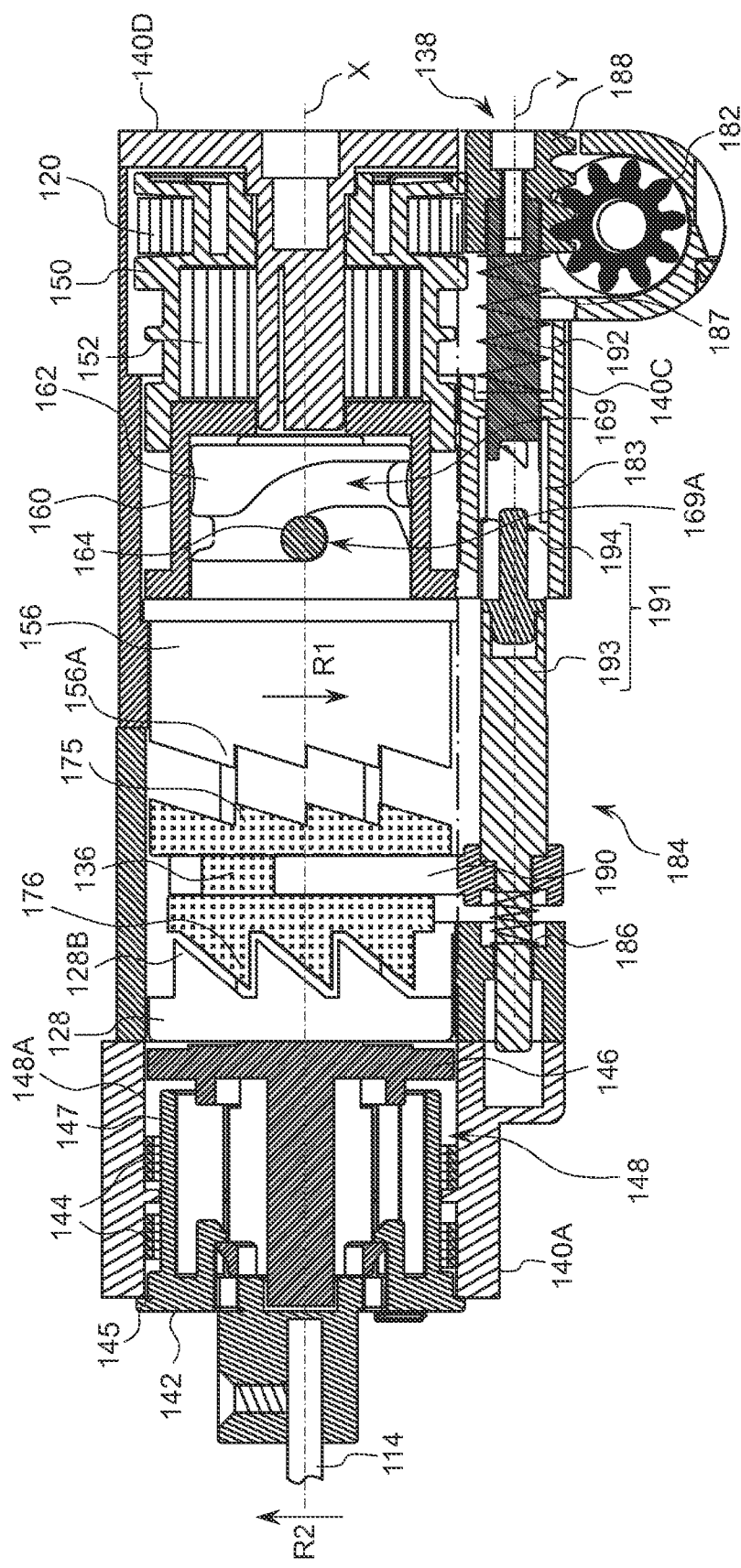
FIG. 17 is a schematic view illustrating the control module in a first driving mode of operation by having a switch member engaged with a stop member.
Figure 18:
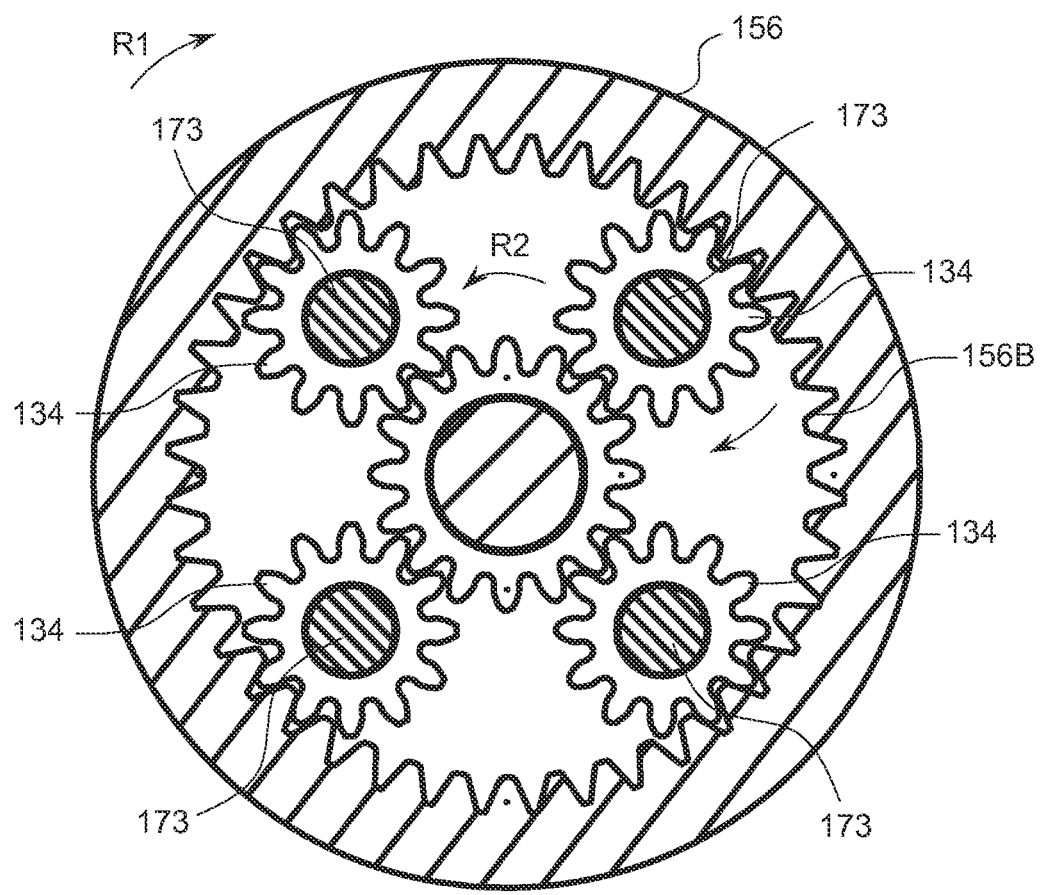
FIG. 18 is a schematic view illustrating exemplary rotational displacement that can occur in the control module while the switch member is engaged with the stop member.

In conjunction with FIGS. 4-16, FIGS. 17-20 are schematic views illustrating exemplary operation of the control module 116. In FIG. 17, the switch member 136 is shown as being engaged with the stop member 128 (i.e., the teeth 176 and 128B are engaged with each other) and disengaged from the ring 156. While the control module 116 is in this configuration, the pull member 120 can be pulled downward to cause rotation of the spool 150 and the ring 156 in the same direction R1. Because the switch member 136 is engaged with the stop member 128, rotation of the switch member 136 and the carrier 132 in the direction R1 is blocked. Accordingly, the switch member 136 and the carrier 132 remain stationary, and the rotation of the ring 156 can drive rotation of the planetary gears 134 about their respective shaft portion 173, which in turn can drive the central gear 130 (and also the actuating part 146 and the transmission axle 114 rotationally coupled therewith) to rotate about the longitudinal axis X in the direction R2 opposite to R1 through the meshing engagement between the planetary gears 134 and the central gear 130. This is schematically shown in FIG. 18.

The engagement of the switch member 136 with the stop member 128 can exemplary set the lower or downward driving mode of operation, i.e., the pull member 120 is pulled downward to drive rotation of the central gear 130, the actuating part 146 and the transmission axle 114 in the aforementioned direction R2 to cause unwinding of the suspension members 112 from the winding units 110 for lowering the bottom part 106. As shown in FIG. 9, the rib 146B of the actuating part 146 can accordingly push against the prong 144A to contract each spring 144 and urge rotation of the spring 144 in the same direction. As the contracted springs 144 rotate with the actuating part 146, the prongs 144A of the springs 144 can in turn push against the flange surface 147A of the collar 142, which causes rotation of the collar 142 and the transmission axle 114 to lower the bottom part 106.

Figure 19:
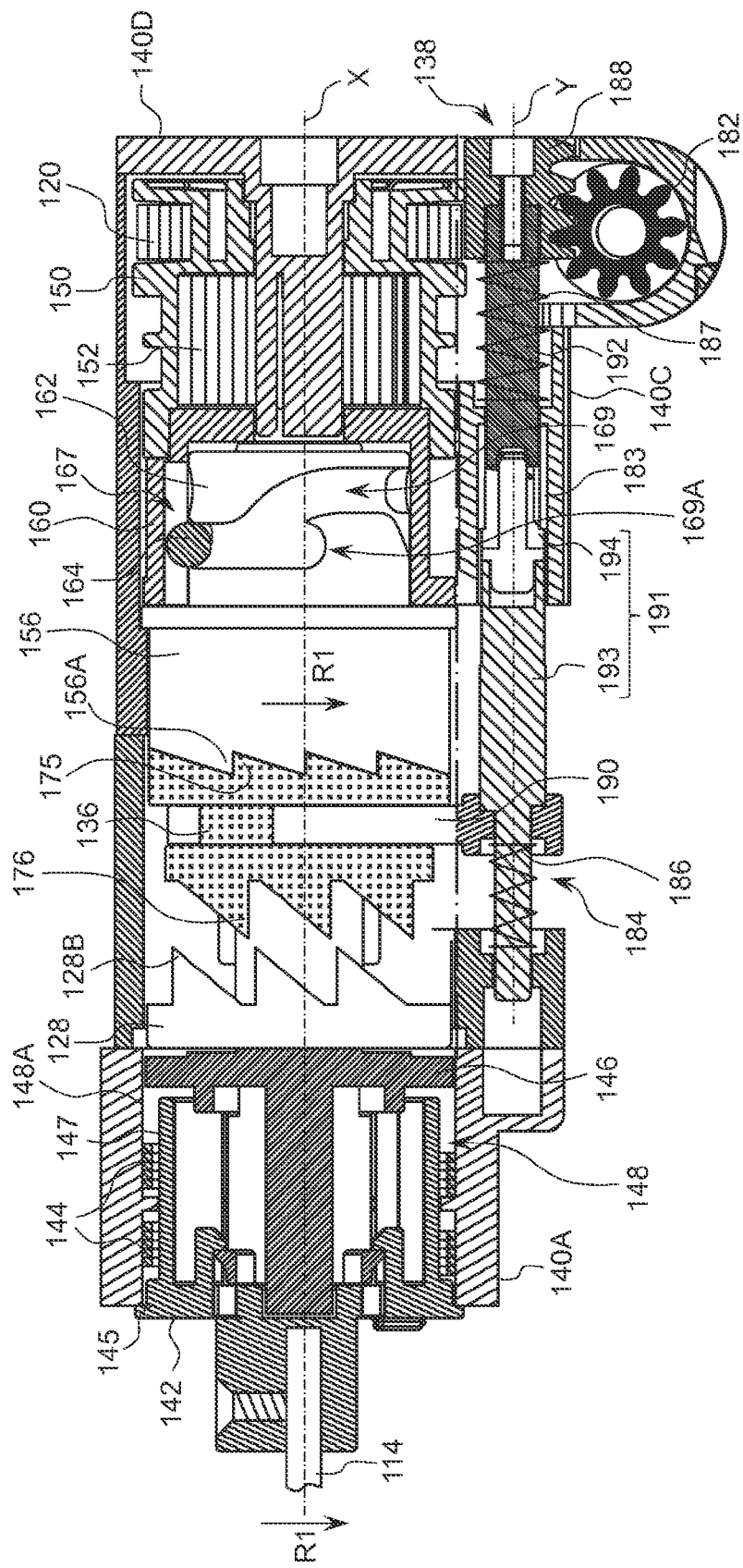
FIG. 19 is a schematic view illustrating the control module in a second driving mode of operation by having the switch member engaged with a ring.
Figure 20:
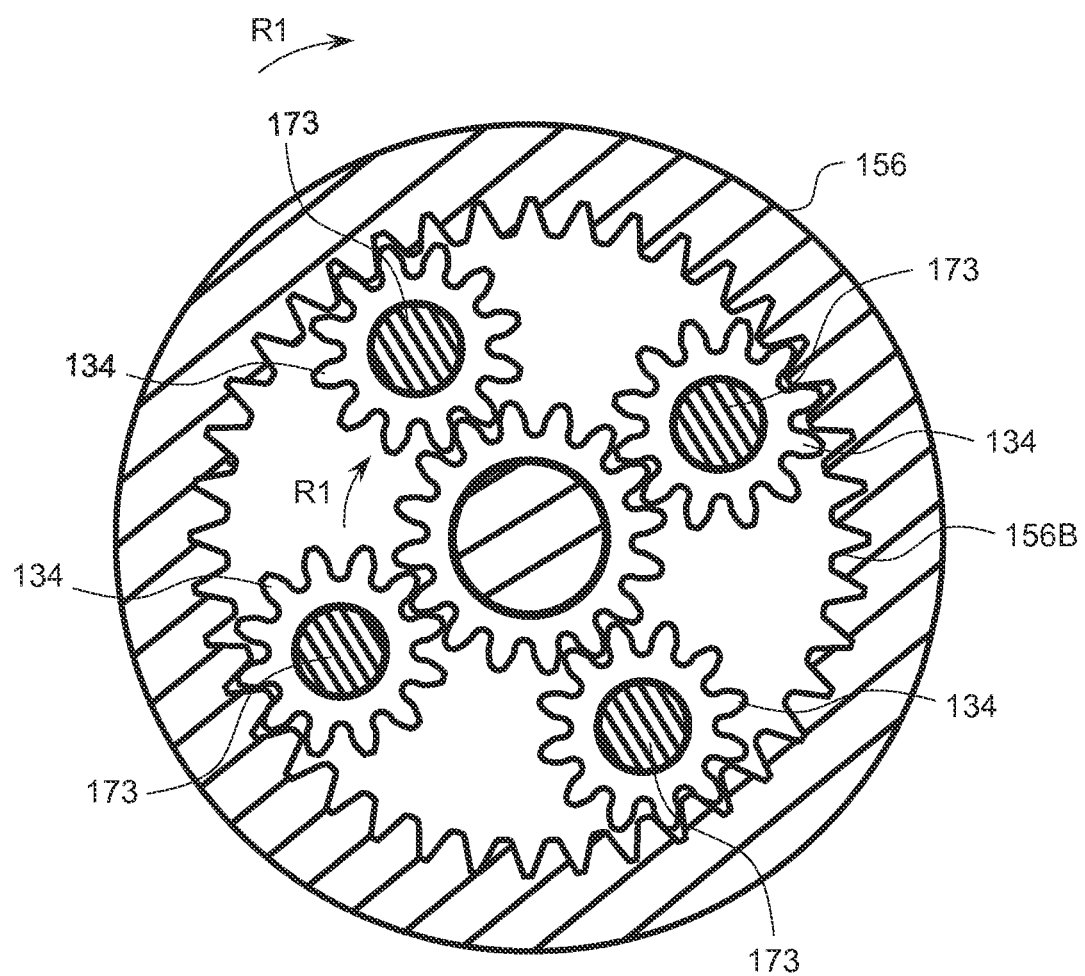
FIG. 20 is a schematic view illustrating exemplary rotational displacement that can occur in the control module while the switch member is engaged with the ring.

In FIG. 19, the switch member 136 is shown as being engaged with the ring 156 (i.e., the teeth 175 and 156A are engaged with each other) and disengaged from the stop member 128. While the control module 116 is in this configuration, the pull member 120 can be pulled downward to cause rotation of the spool 150 and the ring 156 in the same direction R1. Owing to the engagement between the switch member 136 and the ring 156, this rotation of the ring 156 can drive the switch member 136, the carrier 132, and the planetary gears 134 supported by the carrier 132 to rotate in unison about the longitudinal axis X in the same direction R1. While they rotate about the longitudinal axis X, the planetary gears 134 remain substantially stationary relative to the carrier 132. Owing to the meshing engagement between the central gear 130 and the planetary gears 134, the central gear 130, the actuating part 146 and the transmission axle 114 also rotate in unison about the longitudinal axis X in the same direction R1, which is schematically shown in FIGS. 19 and 20.

The engagement of the switch member 136 with the ring 156 can exemplary set the raise or upward driving mode of operation, i.e., the pull member 120 is pulled downward to drive rotation of the central gear 130, the actuating part 146 and the transmission axle 114 in the aforementioned direction R1 to cause winding of the suspension members 112 in the winding units 110 for raising the bottom part 106. As shown in FIG. 8, the rib 146B of the actuating part 146 thus can push against the prong 144B to contract each spring 144 and urge rotation of the spring 144 in the same direction. As the contracted springs 144 rotate with the actuating part 146, the prongs 144B of the springs 144 can in turn push against the flange surface 147B of the collar 142, which causes rotation of the collar 142 and the transmission axle 114 to raise the bottom part 106.

Owing to the engaging configuration of the ring 156, the planetary gears 134 and the central gear 130, for a given extension of the pull member 120, the number of revolutions performed by each winding unit 110 is greater than the number of revolutions performed by the spool 150 in the lower driving mode of operation. In contrast, when the actuating system 108 is in the raise driving mode of operation, the number of revolutions performed by each winding unit 110 is equal to the number of revolutions performed by the spool 150. In other words, for a same extension of the pull member 120, the resulting vertical course of the bottom part 106 is greater in the lower driving mode than in the raise driving mode.

Referring to FIGS. 7-9 and 13, when the pull member 120 is released after it is extended downward (e.g., in the upward or downward driving mode), the spring 152 can urge the spool 150 to rotate for winding the pull member 120, whereas the drum 162, the ring 156 and the switch member 136 remain stationary. While the spool 150 is winding the pull member 120 and the ring 156 remains stationary, the suspended weight of the bottom part 106 can bias the transmission axle 114 in a direction that causes either of the two flange surfaces 147A and 147B of the collar 142 to push against the corresponding prongs 144A or 144B for enlarging the springs 144. The enlarged springs 144 can thereby frictionally contact with the inner sidewall 148A of the cavity 148 to prevent rotation of the transmission axle 114 in the direction for lowering the bottom part 106.

Referring again to FIGS. 4-6, the switch member 136 can be operatively connected with the rod assembly 118 via the switch actuating mechanism 138. Upon manual rotation of the rod assembly 118, the switch actuating mechanism 138 can operate to displace the switch member 136 between the two functional positions respectively engaged with the stop member 128 and the ring 156 as shown in FIGS. 17 and 19.

The rod assembly 118 can include a wand 180 and a joint part 181. As better shown in FIGS. 1, 3 and 5, the wand 180 can have an elongated shape extending substantially vertical at a front of the window shade 100. The joint part 181 can be pivotally assembled with the casing 140 near an end of the head rail 102, and can have a gear 182. The wand 180 can have an upper end that is pivotally connected with the joint part 181, such that the wand 180 can be tilted relative to a vertical direction to facilitate grasping and manual operation.

Figure 21:
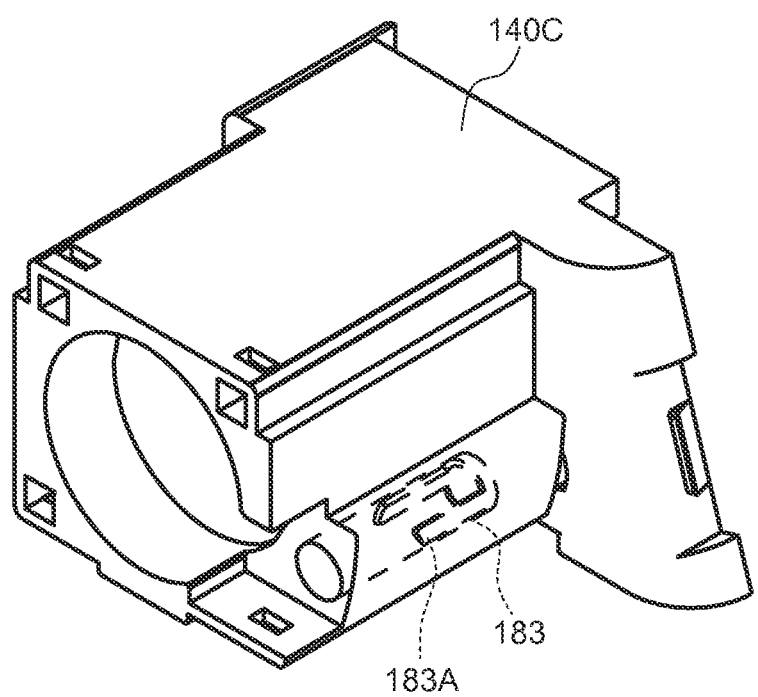
FIG. 21 is a schematic view illustrating a housing portion where is arranged a switch actuating mechanism of the actuating system of the window shade.
Figure 22:
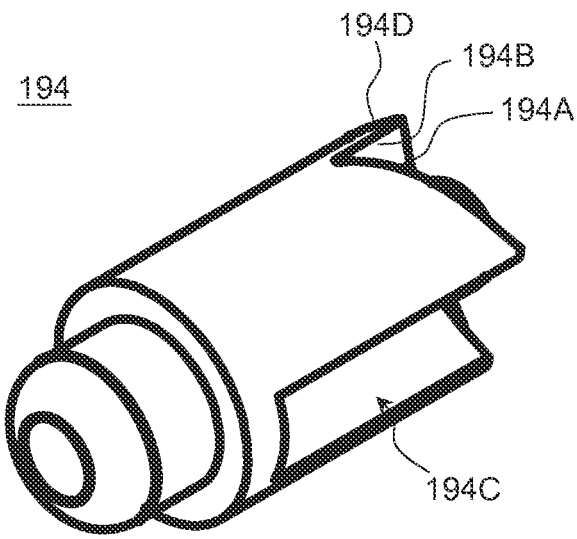
FIG. 22 is a schematic view illustrating a pivotal part of the switch actuating mechanism.
Figure 23:
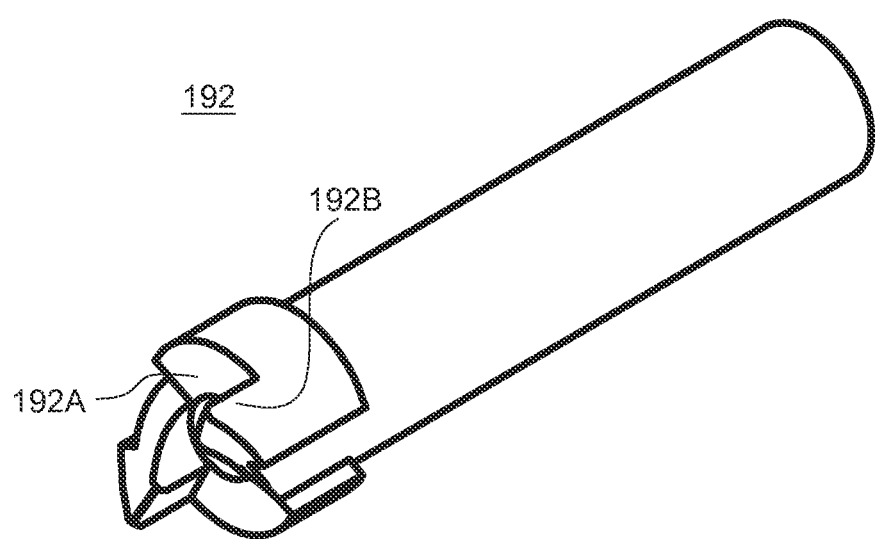
FIG. 23 is a schematic view illustrating a kicking member of the switch actuating mechanism.

In conjunction with FIGS. 5 and 6, FIG. 21 is a schematic view illustrating the housing portion 140C where is arranged the switch actuating mechanism 138. Referring to FIGS. 5, 6 and 21, the switch actuating mechanism 138 can be arranged through an inner cavity of the housing portion 140C of the casing 140 that has an inner sidewall provided with a protruding abutment 183. The switch actuating mechanism 138 can include an arm assembly 184, and two springs 186 and 187. The arm assembly 184 extends generally parallel to the longitudinal axis X of the transmission axle 114, and includes a toothed part 188 that is meshed with the gear 182 of the rod assembly 118. The arm assembly 184 can be driven in movement along a displacement axis Y parallel to the transmission axle 114 by rotating the rod assembly 118, which can displace the switch member 136 for selectively engagement with the stop member 128 or the ring 156.

In one embodiment, the arm assembly 184 can further include a bracket 190, a shaft assembly 191 and a kicking member 192. The bracket 190 can extend approximately perpendicular to the displacement axis Y and pivotally connect with the switch member 136. Moreover, the bracket 190 and the shaft assembly 191 can slide in unison along the displacement axis Y to switch the position of the switch member 136.

Referring to FIGS. 5, 6 and 21, the shaft assembly 191 can include a rod segment 193 having an end pivotally connected with a pivotal part 194. The rod segment 193 can be affixed with the bracket 190. The pivotal part 194 can slide with the rod segment 193 along the displacement axis Y, and can also rotate about the displacement axis Y relative to the rod segment 193. In conjunction with FIGS. 5, 6 and 21, FIG. 22 is a schematic view illustrating the pivotal part 194. The pivotal part 194 can have two sets of similar structural features disposed around the displacement axis Y, each set of the structural features including a first ramp surface 194A, an engaging edge 194B, a slot 194C and a second ramp surface 194D. The ramp surface 194A can have a first end adjacent to the engaging edge 194B, and a second end adjacent to the slot 194C. The slot 194C can have an elongated shape extending parallel to the displacement axis Y. The ramp surface 194D can be have two opposite ends respectively connected with the engaging edge 194B and the second slot 194C of the other set of structural features.

The shaft assembly 191 can be movable along the displacement axis Y between a first position where the engaging edge 194B of the pivotal part 194 is disengaged from the end 183A of the abutment 183, and a second position where the engaging edge 194B of the pivotal part 194 rests in contact against an end 183A of the abutment 183.

In conjunction with FIGS. 5, 6 and 21, FIG. 23 is a schematic view illustrating the kicking member 192. The kicking member 192 can be assembled adjacent to the pivotal part 194. The kicking member 192 can have one end affixed with the toothed part 188. Another end of the kicking member 192 opposite to that of the toothed part 188 can be provided with two sets of similar structural features disposed around the displacement axis Y, each set including a ramp surface 192A and a stop edge 192B arranged at one end of the ramp surface 192A. The kicking member 192 can move along the displacement axis Y to bring the pivotal part 194 into resting contact against the end 183A of the abutment 183, or to push the pivotal part 194 for disengagement from the end 183A of the abutment 183.

The two springs 186 and 187 can be respectively connected with the shaft assembly 191 and the kicking member 192, and can respectively bias the shaft assembly 191 and the kicking member 192 toward each other.

Figure 24:
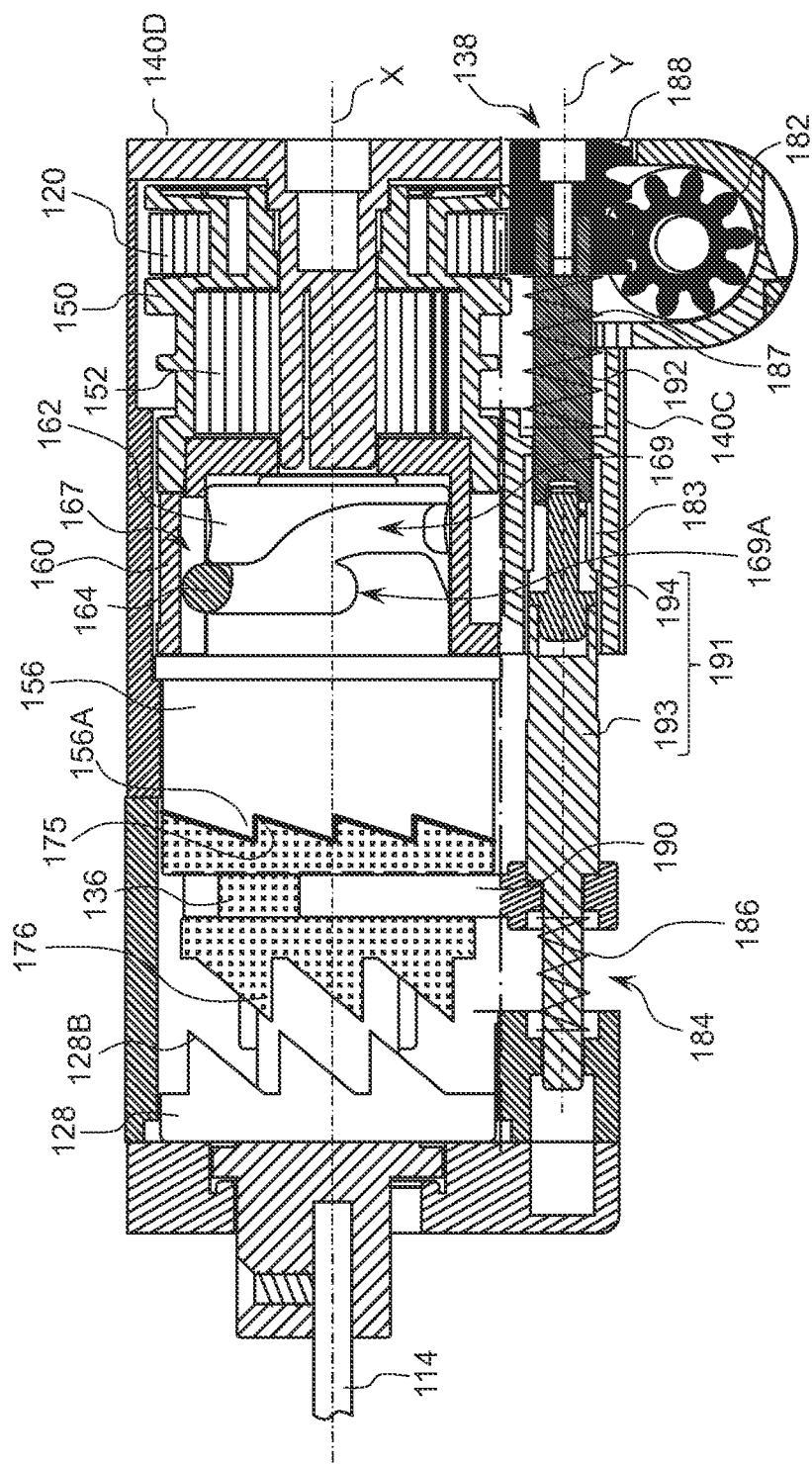
FIGS. 24, 25A and 25B are schematic views illustrating the switch actuating mechanism in a configuration where the switch member is engaged with the ring.
Figure 25A:
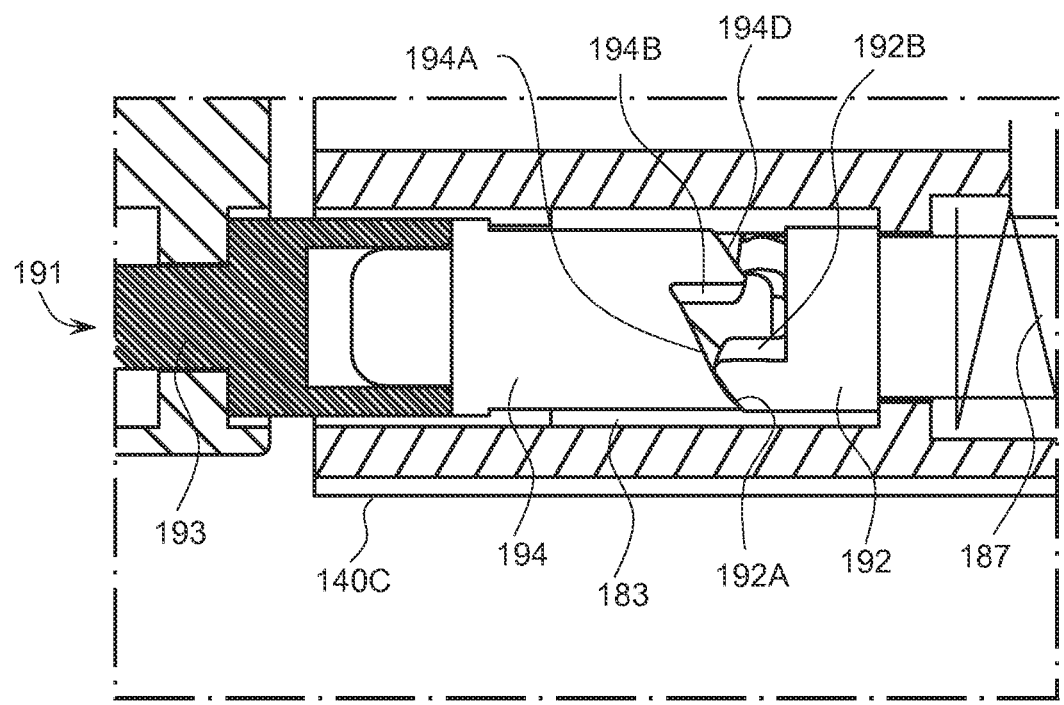
Figure 25B:
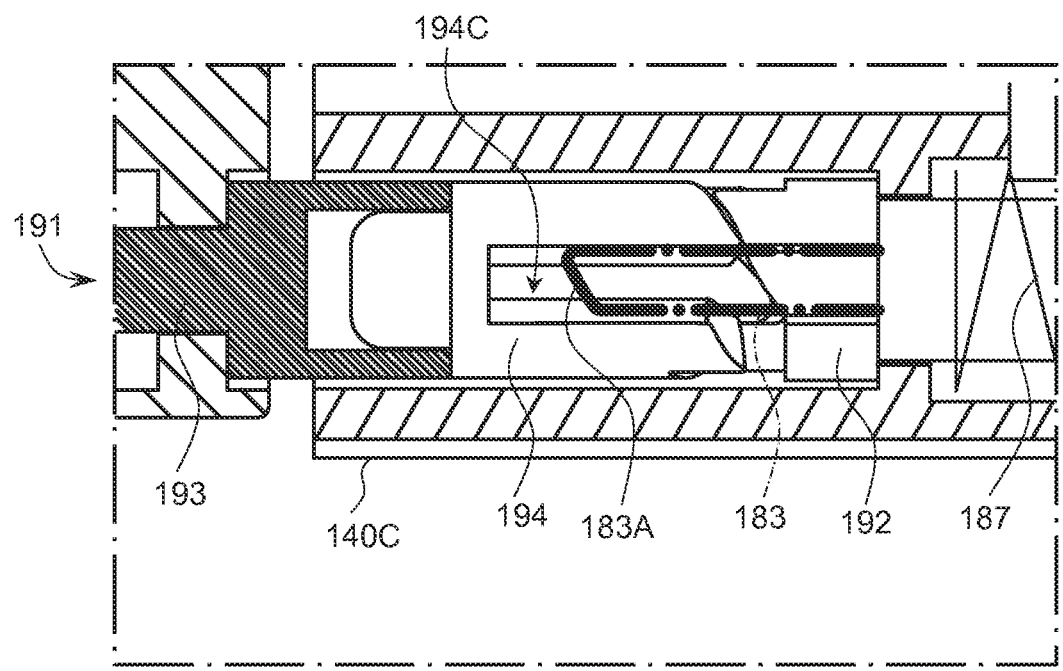
Figure 26:
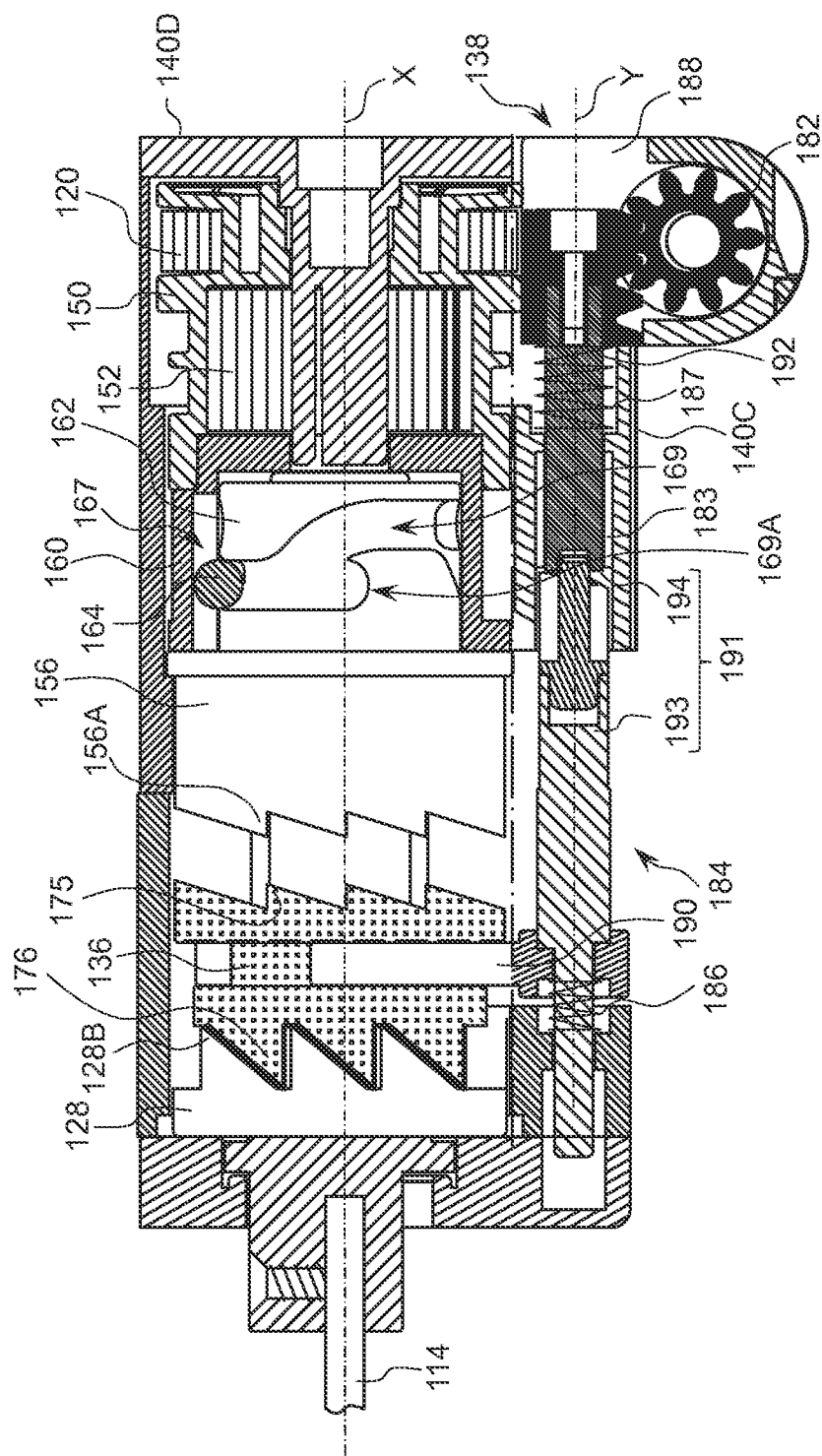
FIGS. 26-29B are schematic views illustrating exemplary operation of the switch actuating mechanism for moving the switch member from a position engaged with the ring to another position engaged with the stop member.
Figure 27A:
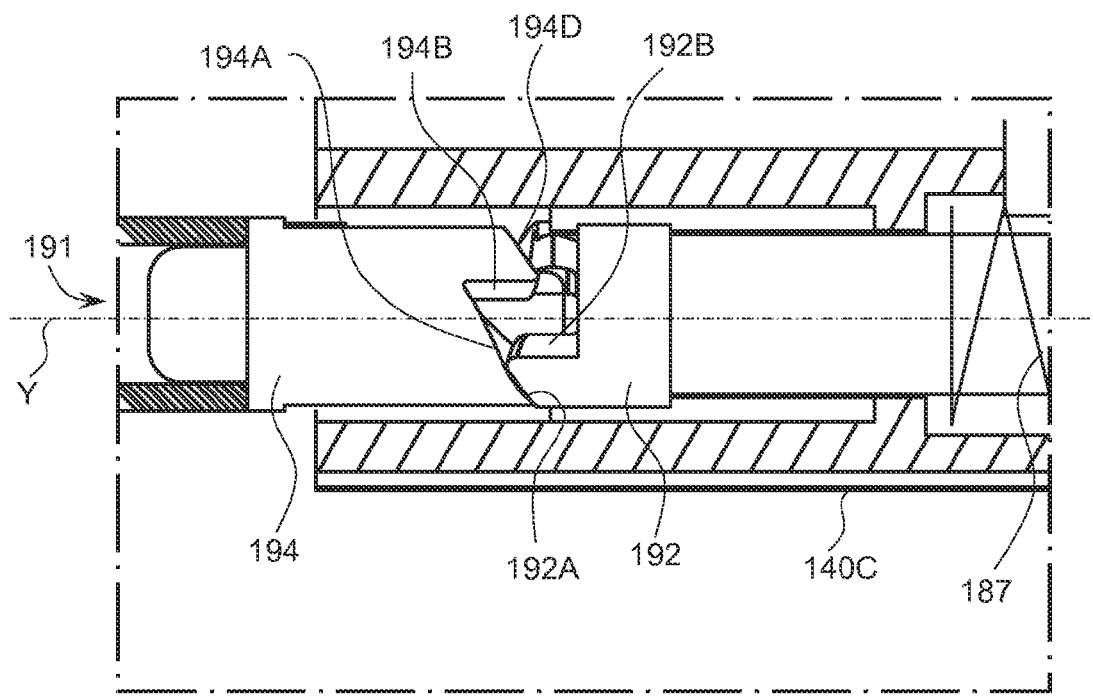
Figure 27B:
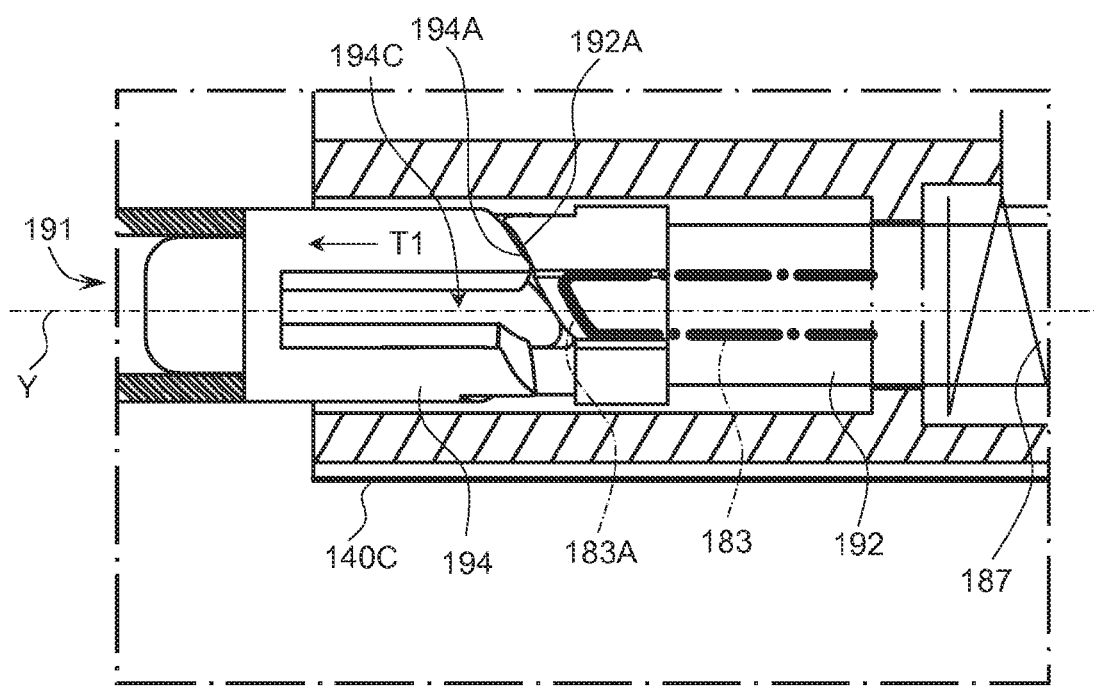

FIGS. 24-32 are schematic views illustrating exemplary operation of the switch actuating mechanism 138. In FIGS. 24, 25A and 25B, the switch actuating mechanism 138 is shown in a configuration where the switch member 136 is engaged with the ring 156. In this configuration, the shaft assembly 191 is in the first position where the engaging edge 194B of the pivotal part 194 is disengaged from the end 183A of the abutment 183, and the abutment 183 is received in the slot 194C of the pivotal part 194. FIGS. 25A and 25B are schematic views representing the shaft assembly 191 and the kicking member 192 in this configuration under two different angles of view.

Referring to FIGS. 1 and 26-29B, for engaging the switch member 136 with the stop member 128, the rod assembly 118 can be rotated in a direction S, which causes the joint part 181 to rotate and push the kicking member 192 to slide along the displacement axis Y in a direction T1 owing to the meshing engagement between the gear 182 and the toothed part 188. This sliding displacement of the kicking member 192 can compress the spring 187 and cause the ramp surface 192A of the kicking member 192 to contact with the ramp surface 194A of the pivotal part 194, which pushes the shaft assembly 191 to slide along the displacement axis Y in the direction T1 for moving the switch member 136 from the ring 156 toward the stop member 128. This displacement of the shaft assembly 191 also causes the abutment 183 to disengage from the slot 194C of the pivotal part 194 and compress the spring 186. This is shown in FIGS. 27A and 27B, which are two schematic views illustrating a portion of the arm assembly 184 at different angles of views. As long the abutment 183 remains in the slot 194C, rotation of the pivotal part 194 about the displacement axis Y is prevented.

Figure 28A:
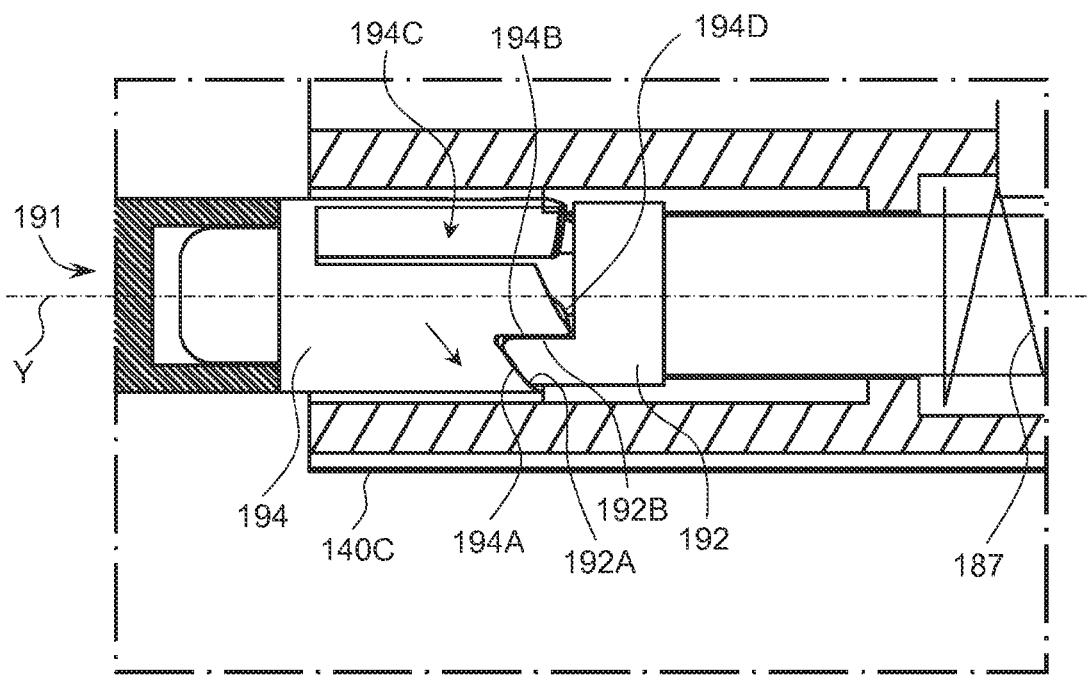
Figure 28B:
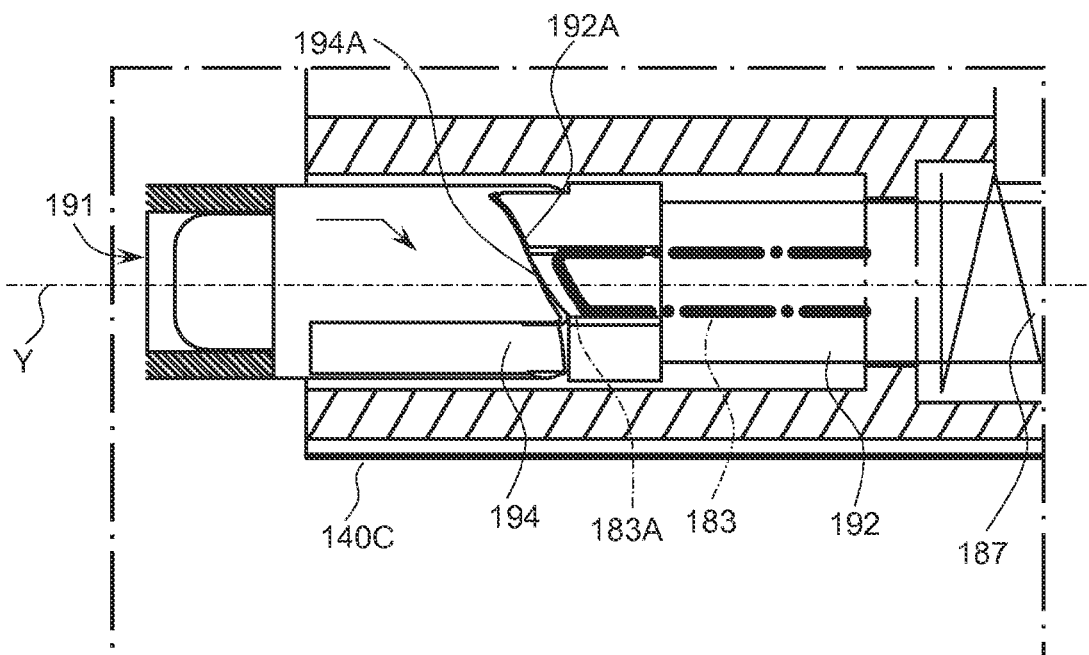

Referring to FIGS. 28A and 28B, once the abutment 183 is disengaged from the slot 194C, the pushing action applied by the kicking member 192 further causes rotation of the pivotal part 194 about the displacement axis Y until one engaging edge 194B contacts with the stop edge 192B of the kicking member 192, and the abutment 183 is misaligned from the slot 194C and faces the first ramp surface 194A.

Figure 29A:
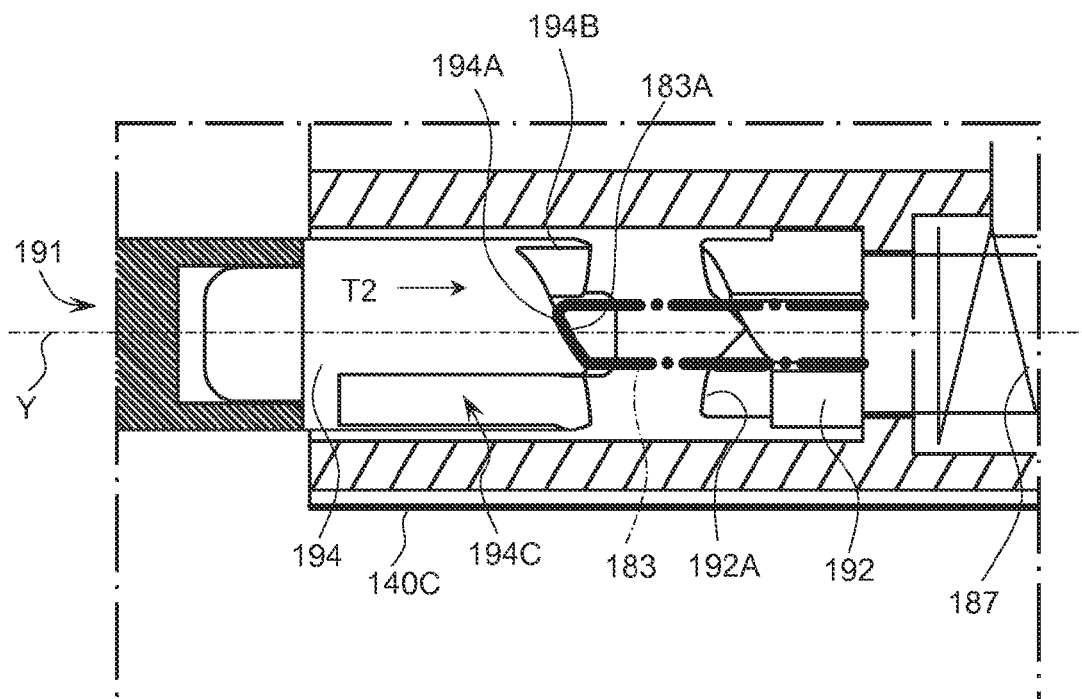
Figure 29B:
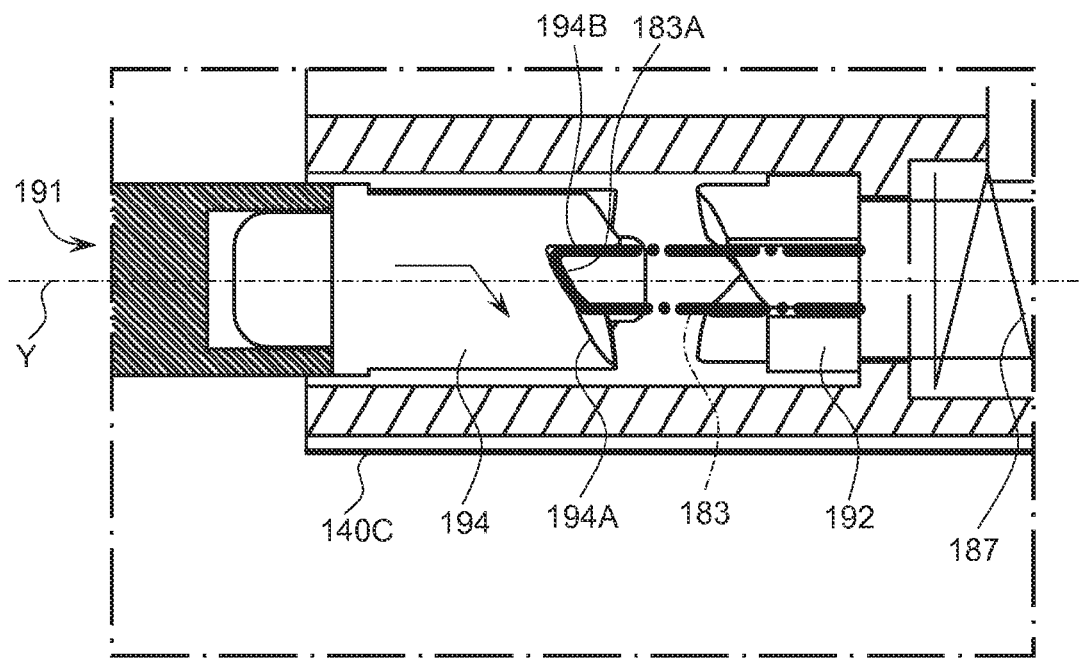

Referring to FIGS. 29A and 29B, the rod assembly 118 then can be released, and the spring 187 can bias the kicking member 192 to slide along the displacement axis Y in a direction T2 opposite to T1 to reversely rotate the rod assembly 118 for recovering its initial position. In the meantime, the spring 186 can bias the shaft assembly 191 in the same direction T2, which urges the ramp surface 194A of the pivotal part 194 to come in sliding contact with the end 183A of the abutment 183. Once the end 183A of the abutment 183 rides the first ramp surface 194A of the pivotal part 194, the pivotal part 194 can rotate about the displacement axis Y until the engaging edge 194B engages with the end 183A, whereas the kicking member 192 can be biased by the spring 187 to move out of contact with the pivotal part 194. The engagement between the end 183A of the abutment 183 and the engaging edge 194B of the pivotal part 194 can keep the shaft assembly 191 in the second position for holding the switch member 136 engaged with the stop member 128.

Figure 30A:
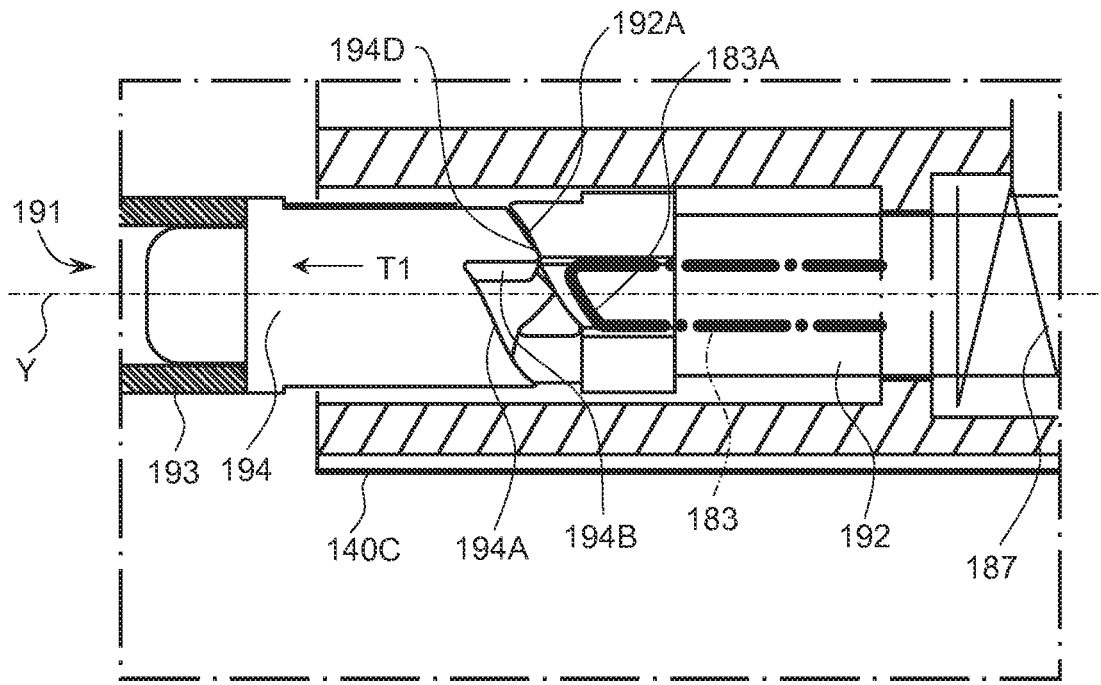
FIGS. 30A-32 are schematic views illustrating exemplary operation of the switch actuating mechanism for moving the switch member from the position engaged with the stop member back to the position engaged with the ring.

FIGS. 30A-32 are schematic views illustrating exemplary operation of the switch actuating mechanism 138 to displace the switch member 136 from the position engaged with the stop member 128 to the position engaged with the ring 156. Referring to FIG. 30A in conjunction with FIGS. 1 and 5, for engaging the switch member 136 with the ring 156, the rod assembly 118 can be rotated in the same direction S, which causes the joint part 181 to rotate and push the kicking member 192 to slide along the displacement axis Y in the direction T1. This sliding displacement of the kicking member 192 can compress the spring 187 and cause the ramp surface 192A of the kicking member 192 to contact with the second ramp surface 194D of the pivotal part 194, which pushes the shaft assembly 191 to slide along the displacement axis Y in the direction T1 for disengaging the pivotal part 194 from the end 183A of the abutment 183. This displacement of the shaft assembly 191 may also cause a slight movement of the switch member 136 toward the stop member 128.

Figure 30B:
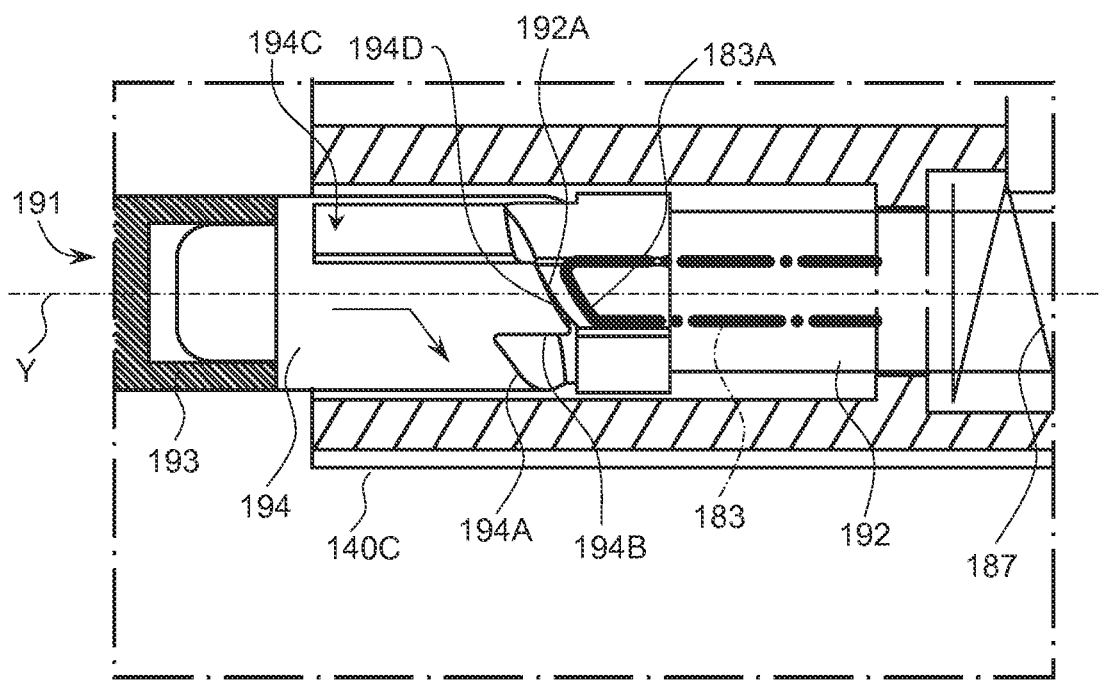

Referring to FIG. 30B, once the pivotal part 194 disengages from the end 183A of the abutment 183, the sliding contact between the second ramp surface 194D and the ramp surface 192A of the kicking member 192 causes rotation of the pivotal part 194 until the end 183A of the abutment 183 faces the second ramp surface 194D.

Figure 31A:
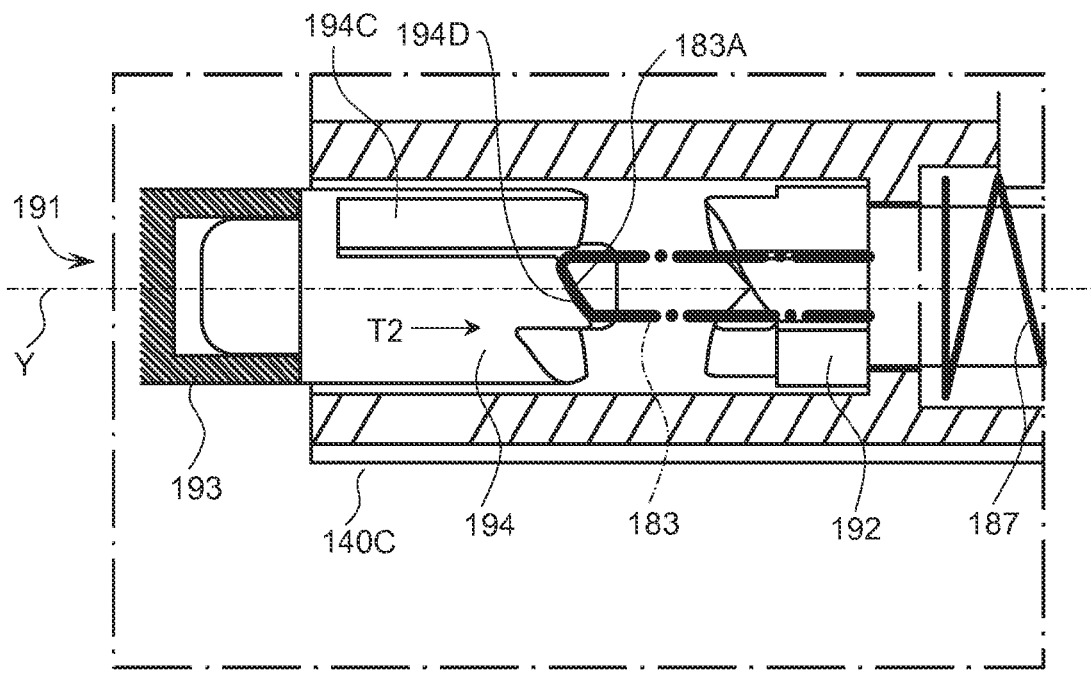

Referring to FIG. 31A, the rod assembly 118 then can be released, and the spring 187 can bias the kicking member 192 to slide along the displacement axis Y in a direction T2 opposite to T1 to reversely rotate the rod assembly 118 for recovering its initial position. In the meantime, the spring 186 can bias the shaft assembly 191 in the same direction T2, which urges the second ramp surface 194D of the pivotal part 194 to come in sliding contact with the end 183A of the abutment 183.

Figure 31B:
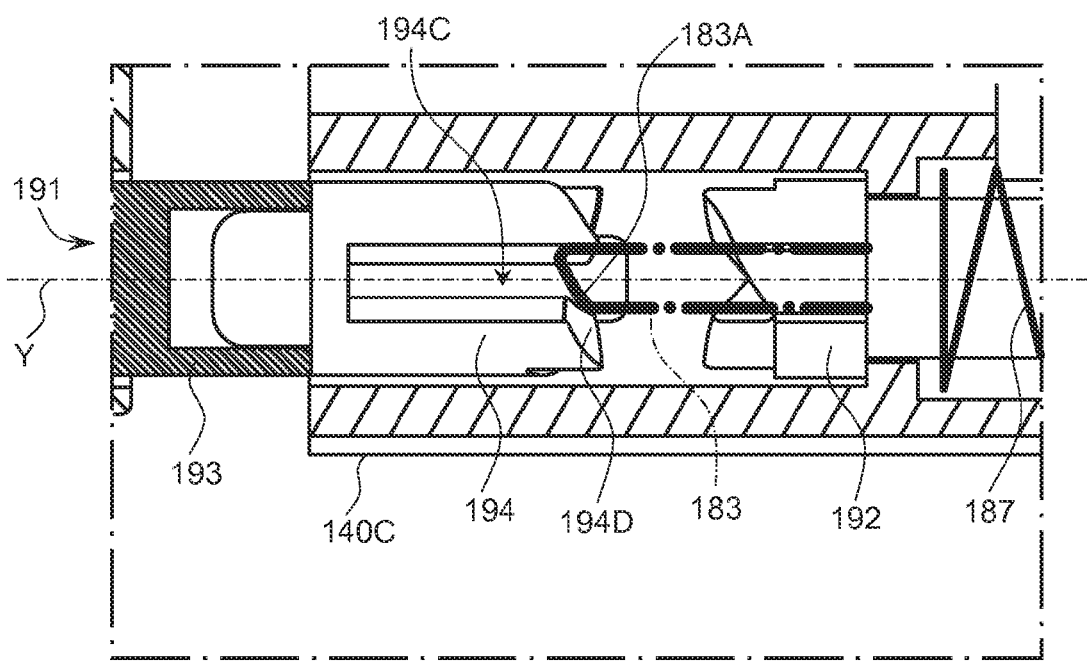

Referring to FIG. 31B, once the end 183A of the abutment 183 rides the second ramp surface 194D of the pivotal part 194, the pivotal part 194 can rotate about the displacement axis Y until the abutment 183 can engage with one slot 194C of the pivotal part 194, whereas the kicking member 192 can be biased by the spring 187 to move out of contact with the pivotal part 194.

Figure 31C:
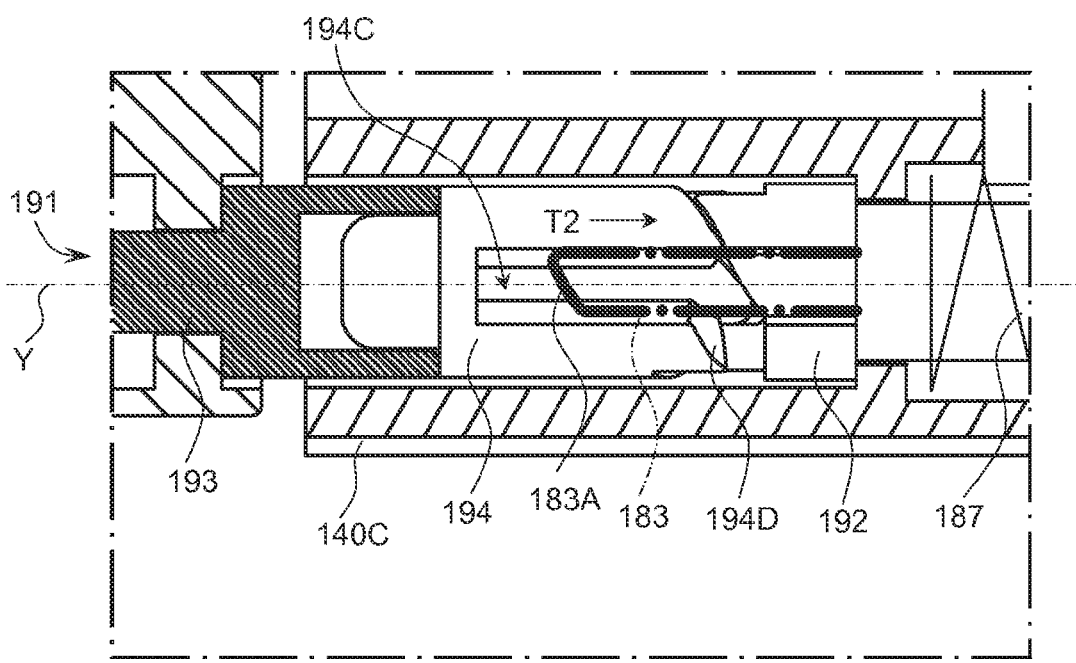
Figure 32:
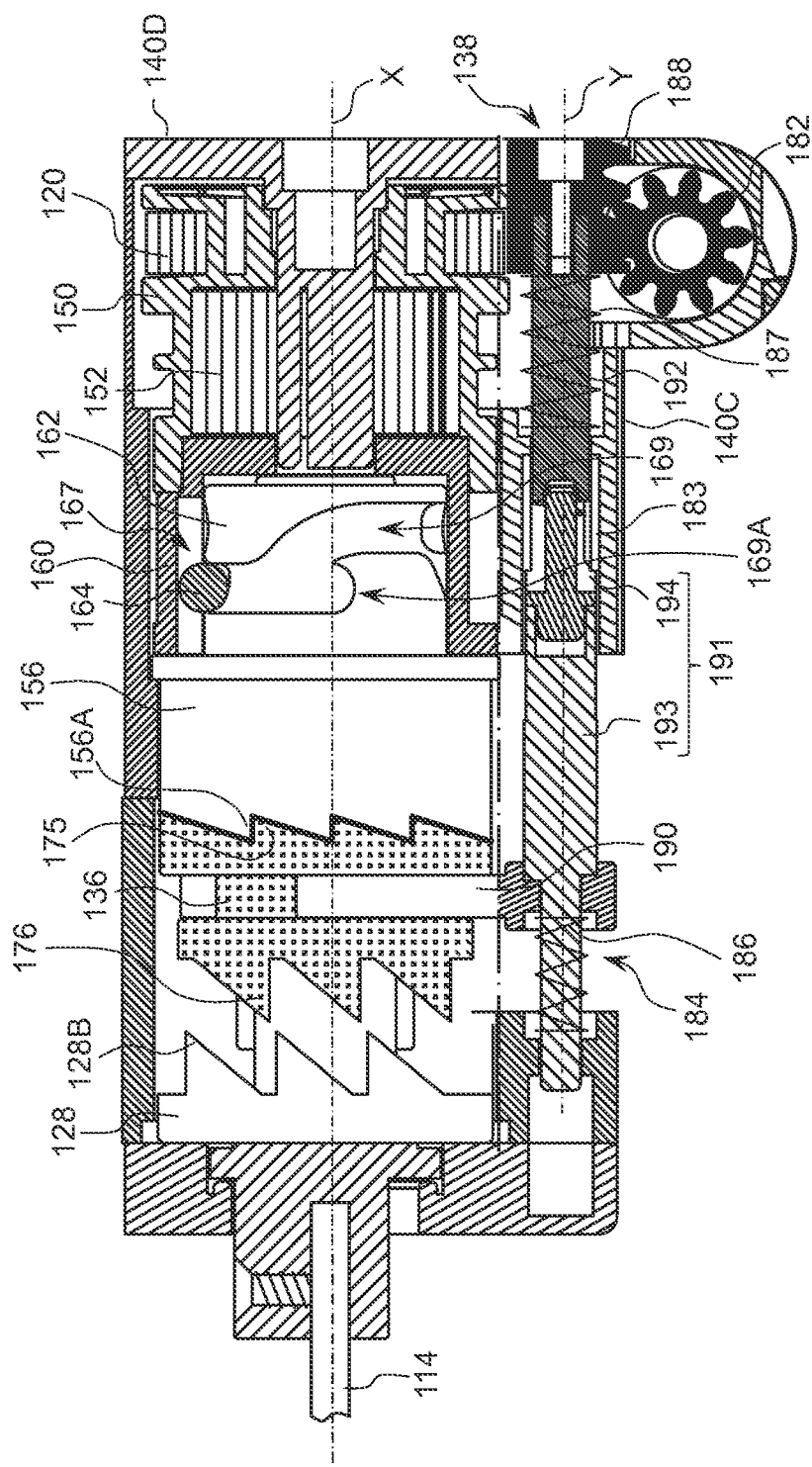

Referring to FIGS. 31C and 32, the biasing action applied by the spring 186 can then urge the shaft assembly 191 in the direction T2 to move the switch member 136 into engagement with the ring 156 and disengage the ramp surfaces 194A, 194D and engaging edges 194B of the pivotal part 194 from the end 183A of the abutment 183. During this displacement, the abutment 183 is slidably received in the slot 194C of the pivotal part 194.

With the aforementioned switch actuating mechanism 138, the rod assembly 118 can thus be rotated in the same direction to selectively engage the switch member 136 with any of the stop member 128 and the ring 156 for switching the actuating system 108 between the lower and raise driving mode of operation.

Figure 33:
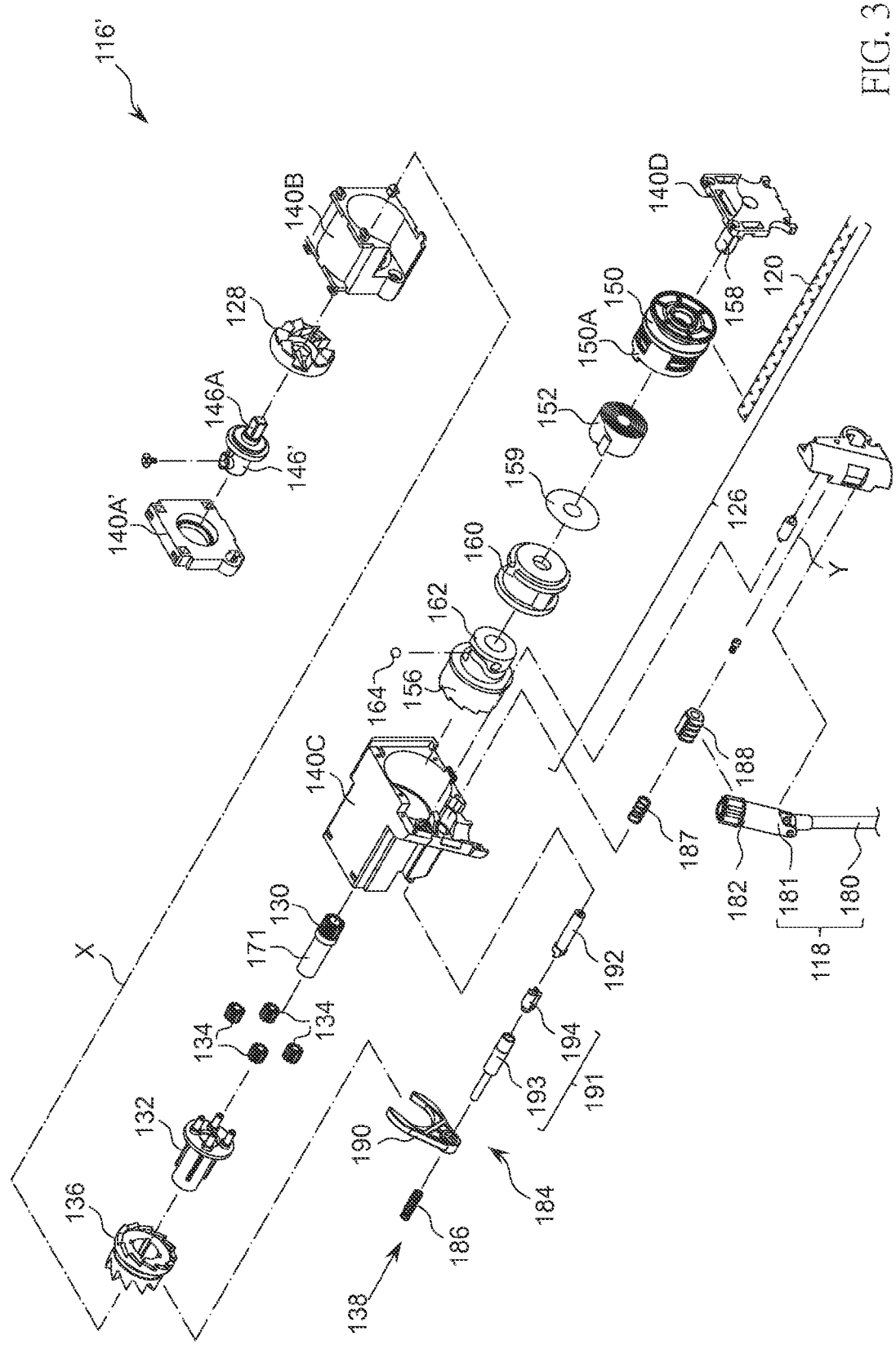
FIG. 33 is a schematic view illustrating a variant embodiment of a control module having no arresting mechanism.

FIG. 33 is a schematic view illustrating a variant embodiment of a control module 116'. The control module 116' is substantially similar to the control module 116 described previously, except that there are no springs 144 and no collar 142 and the housing portion 140A' has no inner sidewall in frictional contact with a spring. The actuating part 146' of the control module 116' has no rib 146B and can be directly connected with the transmission axle 114. In other words, the control module 116' has no arresting mechanism for keeping the bottom part 106 stationary, such arresting mechanism being arranged at another location of the actuating system outside the control module 116, e.g., in the winding units. The remaining parts may be similar to the embodiment described previously.

Figure 34:
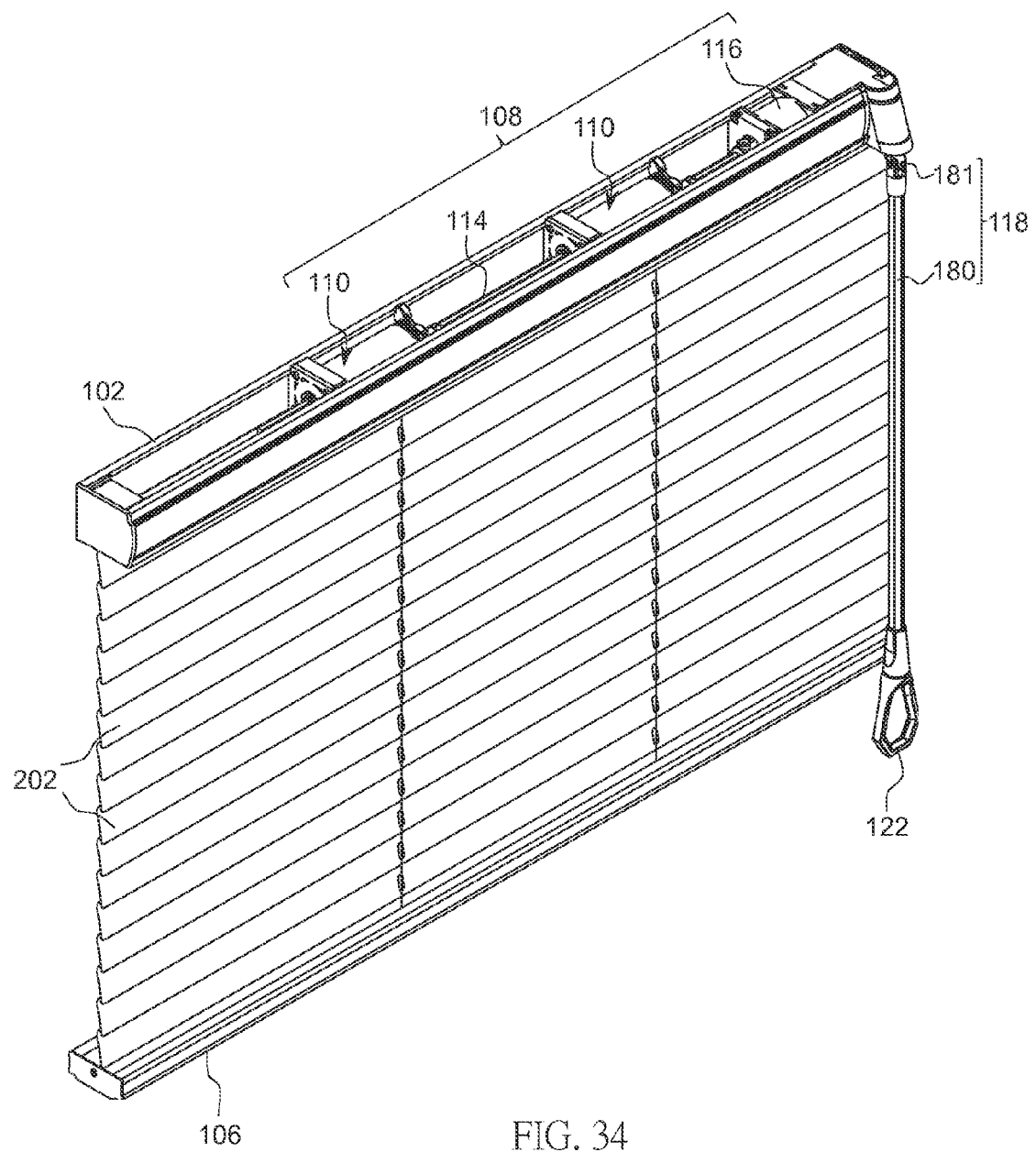
FIG. 34 is a schematic view illustrating an example of a window shade including a plurality of slats that are suspended between a head rail and a bottom part.
Figure 35:
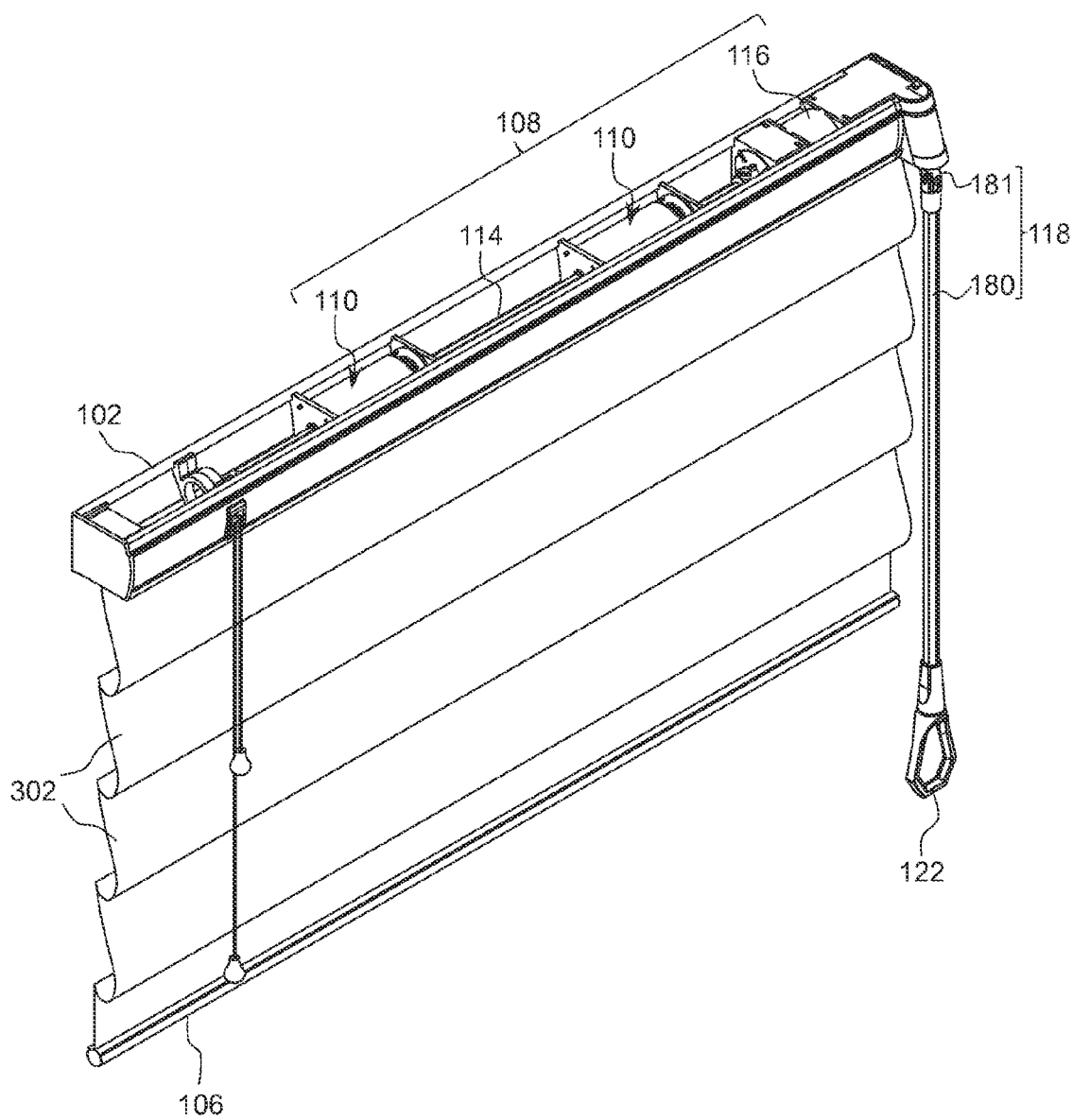
FIG. 35 is a schematic view illustrating another example of a window shade including a plurality of curved vanes suspended between the head rail and the bottom part.

It will be appreciated that the actuating systems described herein may be suitable for any types of vertical window shades. FIG. 34 illustrates an example of a window shade including a plurality of slats 202 that are suspended between the head rail 102 and the bottom part 106. FIG. 35 illustrates another example of a window shade including a plurality of curved vanes 302 suspended between the head rail 102 and the bottom part 106. All of these window shades can use the actuating systems described previously to desirably adjust the height of the bottom part 106.

The structures described herein use an actuating system that can selectively switch between a lower and a raise mode of operation by rotating a rod assembly, and use a downward displacement of a pull member to lower and raise the window shade depending on whether its switching state. The actuating systems are simple to operate, allow convenient adjustment of the window shade, and are safe as the pull member has a limited length of extension.

Realizations of the structures and methods have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. An actuating system for a window shade, comprising:
a transmission axle and a central gear rotationally coupled with each other, the transmission axle defining an axis and being rotatable to collapse and expand a window shade;
a carrier supporting a plurality of planetary gears that are disposed around the central gear, the carrier being rotatable relative to the central gear, and the planetary gears being respectively meshed with the central gear;
a driving unit including a ring and a pull member, the ring being arranged around the planetary gears and internally meshed with the planetary gears, and the pull member being operable to drive rotation of the ring in a first direction;
a fixed stop member axially spaced apart from the ring; and
a switch member rotationally coupled with the carrier, the switch member being operable to selectively engage with either of the ring and the stop member;
wherein a rotation of the ring in the first direction drives a rotation of the central gear and the transmission axle in a second direction opposite to the first direction when the switch member is engaged with the stop member, and a rotation of the ring in the first direction drives the central gear and the transmission axle to rotate in the same first direction when the switch member is engaged with the ring.

2. The actuating system according to claim 1, wherein the switch member and the ring when engaged with each other rotate with the carrier in the first direction about the axis of the transmission axle, and the switch member and the carrier are kept stationary when the switch member is engaged with the stop member.

3. The actuating system according to claim 1, wherein the switch member is assembled for sliding along the axis of the transmission axle relative to the carrier.

4. The actuating system according to claim 1, wherein the switch member has a plurality of first teeth protruding toward the stop member, and a plurality of second teeth protruding toward the ring at a side opposite to that of the first teeth.

5. The actuating system according to claim 1, wherein the switch member is arranged between the ring and the stop member, the ring and the stop member respectively having a plurality of third and fourth teeth respectively projecting toward the switch member.

6. The actuating system according to claim 1, wherein the driving unit further includes a spool, the spool being rotatable in the second direction to wind the pull member.

7. The actuating system according to claim 6, wherein the ring remains stationary while the spool rotates in the second direction to wind the pull member.

8. The actuating system according to claim 1, wherein the pull member is a cord that is pulled downward to drive rotation of the ring in the first direction.

9. The actuating system according to claim 1, further including a casing having a cavity, and a spring arranged in the cavity and having two spaced-apart prongs, the transmission axle having a first and a second flange surface, the first flange surface being able to push against a first one of the two prongs for enlarging the spring when the ring remains stationary, the enlarged spring being in frictional engagement with an inner sidewall of the cavity to prevent rotation of the transmission axle.

10. The actuating system according to claim 9, wherein the central gear is rotationally coupled with an actuating part that is connected with the transmission axle, the actuating part pushing against either of the two prongs for contracting the spring when the central gear rotates in the first or second direction, the contracted spring thereby loosening the frictional engagement with the inner sidewall to allow rotation of the transmission axle.

11. The actuating system according to claim 10, wherein the transmission axle is attached to a collar on which are provided the first and second flange surfaces, the two prongs of the spring are positioned in a gap between the first and second flange surface, and the actuating part has a rib received in a space between the two prongs.

12. The actuating system according to claim 10, wherein the actuating part has a rib received in a space between the two prongs of the spring, and the first and second flange surfaces of the transmission axle are arranged outside the space.

13. The actuating system according to claim 12, wherein a rotation of the actuating part in the first direction causes the rib to push one of the two prongs in contact against one of the first and second flange surfaces for driving rotation of the transmission axle in the first direction, and a rotation of the actuating part in the second direction causes the rib to push the other one of the two prongs in contact against the other one of the first and second flange surfaces for driving rotation of the transmission axle in the second direction.

14. The actuating system according to claim 1, wherein the central gear and the transmission axle rotate in the second direction to lower a window shade, and in the first direction to raise the window shade.

15. The actuating system according to claim 1, further including a rod assembly that extends substantially vertical and is connected with the switch member via a switch actuating mechanism, the rod assembly being rotatable to drive displacement of the switch member along the axis of the transmission axle for selectively engaging with either of the stop member and the ring.

16. The actuating system according to claim 15, wherein the rod assembly is rotated in a same direction to drive displacement of the switch member for engaging with the stop member and the ring.

17. The actuating system according to claim 15, wherein the rod assembly has an end provided with a gear, and the switch actuating mechanism includes:

an arm assembly pivotally connected with the switch member and including a toothed part meshed with the gear, wherein the arm assembly is driven in movement along a displacement axis parallel to the transmission axle by the rod assembly to displace the switch member for selectively engaging with the stop member or the ring.

18. The actuating system according to claim 17, wherein the switch member is movable between a first and a second position, and the arm assembly is arranged through a fixed casing and includes:
 a pivotal part rotatable about the displacement axis, the pivotal part resting in contact against an abutment affixed with the casing to keep the switch member in the first position; and
 a kicking member slidable along the displacement axis to push the pivotal part to disengage from the abutment.

19. The actuating system according to claim 18, wherein the pivotal part has an engaging edge that rests in contact with an end of the abutment when the switch member is in the first position, the pivotal part and the kicking member respectively have a first and a second ramp surface that slidably contact with each other when the kicking member pushes the pivotal part to disengage from the end of the abutment, the sliding contact between the first and second ramp surfaces causing rotation of the pivotal part so that the abutment engages with a slot of the pivotal part for allowing a spring-biased displacement of the pivotal part in a direction to move the switch member to the second position.

20. A window shade comprising:
 a head rail, a bottom part, and a shading structure arranged vertically between the head rail and the bottom rail;
 a winding unit having a suspension member connected with the bottom part; and
 the actuating system according to claim 1 arranged in the head rail, the winding unit being rotationally coupled with the transmission axle, wherein the transmission axle rotates in the second direction to cause unwinding of the suspension member from the winding unit for lowering the bottom part, and in the first direction to wind the suspension member into the winding unit for raising the bottom part.

* * * * *